(12) United States Patent
Schmeidler et al.

(10) Patent No.: US 7,707,641 B2
(45) Date of Patent: Apr. 27, 2010

(54) METHOD AND APPARATUS FOR SECURE CONTENT DELIVERY OVER BROADBAND ACCESS NETWORKS

(75) Inventors: Yonah Schmeidler, Cambridge, MA (US); Derek Atkins, Somerville, MA (US); Mark W. Eichin, Somerville, MA (US); David J. Rostcheck, Arlington, MA (US)

(73) Assignee: Softricity, Inc., Boston, MA (US)

( * ) Notice: Subject to any disclaimer, the term of this patent is extended or adjusted under 35 U.S.C. 154(b) by 0 days.

(21) Appl. No.: 11/343,272

(22) Filed: Jan. 30, 2006

(65) Prior Publication Data
US 2006/0272023 A1     Nov. 30, 2006

Related U.S. Application Data

(63) Continuation of application No. 09/310,294, filed on May 12, 1999, now Pat. No. 7,017,188.

(60) Provisional application No. 60/108,602, filed on Nov. 16, 1998.

(51) Int. Cl.
*H04N 7/16* (2006.01)

(52) U.S. Cl. .................. 726/26; 726/27; 713/189; 380/201; 705/57

(58) Field of Classification Search ............. 726/26–33; 380/200–203; 705/50, 51, 57, 59, 71; 725/28, 725/31; 709/229, 223–225, 203; 713/193, 713/189, 165, 167; 717/100, 127, 120, 124, 717/126, 136, 139–142, 167, 168, 171, 174–178
See application file for complete search history.

(56) References Cited

U.S. PATENT DOCUMENTS

| | | | | |
|---|---|---|---|---|
| 5,155,825 A | * | 10/1992 | Moughanni et al. | ......... 711/207 |
| 5,222,134 A | * | 6/1993 | Waite et al. | .................. 705/59 |
| 5,388,242 A | | 2/1995 | Jewett | |
| 5,414,455 A | | 5/1995 | Hooper et al. | |
| 5,442,390 A | | 8/1995 | Hooper et al. | |
| 5,530,754 A | | 6/1996 | Garfinkle | |
| 5,548,645 A | | 8/1996 | Ananda | |
| 5,557,724 A | | 9/1996 | Sampat et al. | |

(Continued)

FOREIGN PATENT DOCUMENTS

EP     0778512     6/1997

(Continued)

OTHER PUBLICATIONS

"Helpers and Plug-In's" Yale University, Jan. 10, 1997.

(Continued)

*Primary Examiner*—Kimyen Vu
*Assistant Examiner*—Nirav Patel
(74) *Attorney, Agent, or Firm*—Woodcock Washburn LLP

(57) ABSTRACT

A system for secure delivery of on-demand content over broadband access networks utilizes a pair of servers of security mechanisms to prevent client processes from accessing and executing content without authorization. A plurality of encrypted titles are stored on a content server coupled to the network. An access server also coupled to the network contains the network addresses of the titles and various keying and authorization data necessary to decrypt and execute title. A client application executing on a user's local computer system is required to retrieve the address, keying and authorization data from the access server before retrieving a title from the content server and enabling execution of the title on a user's local computer system.

13 Claims, 21 Drawing Sheets

U.S. PATENT DOCUMENTS

| | | | |
|---|---|---|---|
| 5,572,643 A | 11/1996 | Judson | |
| 5,600,364 A | 2/1997 | Hendricks et al. | |
| 5,634,849 A | 6/1997 | Abecassis | |
| 5,642,417 A | 6/1997 | Stringer | |
| 5,644,718 A | 7/1997 | Belove et al. | |
| 5,671,412 A | 9/1997 | Christiano | |
| 5,673,316 A * | 9/1997 | Auerbach et al. | 705/51 |
| 5,708,709 A | 1/1998 | Rose | |
| 5,708,832 A | 1/1998 | Inniss et al. | |
| 5,727,065 A | 3/1998 | Dillon | |
| 5,737,619 A | 4/1998 | Judson | |
| 5,745,678 A | 4/1998 | Herzberg et al. | |
| 5,752,005 A | 5/1998 | Jones | |
| 5,757,908 A | 5/1998 | Cooper et al. | |
| 5,758,074 A | 5/1998 | Marlin et al. | |
| 5,764,887 A | 6/1998 | Kells et al. | |
| 5,765,152 A | 6/1998 | Erickson | |
| 5,765,205 A | 6/1998 | Breslau et al. | |
| 5,781,758 A | 7/1998 | Morley | |
| 5,790,753 A | 8/1998 | Krishnamoorthy et al. | |
| 5,793,966 A | 8/1998 | Amstein et al. | |
| 5,805,804 A | 9/1998 | Laursen et al. | |
| 5,809,145 A | 9/1998 | Slik et al. | |
| 5,812,776 A | 9/1998 | Gifford | |
| 5,826,014 A | 10/1998 | Coley et al. | |
| 5,832,483 A | 11/1998 | Barker | |
| 5,838,910 A | 11/1998 | Domenikos et al. | |
| 5,850,352 A | 12/1998 | Moezzi et al. | |
| 5,857,187 A | 1/1999 | Uenoyama et al. | |
| 5,867,651 A | 2/1999 | Dan et al. | |
| 5,867,667 A | 2/1999 | Butman et al. | |
| 5,875,247 A * | 2/1999 | Nakashima et al. | 705/52 |
| 5,889,860 A | 3/1999 | Eller et al. | |
| 5,892,900 A | 4/1999 | Ginter et al. | |
| 5,892,914 A | 4/1999 | Pitts | |
| 5,892,954 A | 4/1999 | Tomas et al. | |
| 5,900,871 A | 5/1999 | Atkin et al. | |
| 5,915,119 A | 6/1999 | Cone | |
| 5,919,247 A | 7/1999 | Van Hoff et al. | |
| 5,920,864 A | 7/1999 | Zhao | |
| 5,925,100 A | 7/1999 | Drewry et al. | |
| 5,928,330 A | 7/1999 | Goetz | |
| 5,930,792 A | 7/1999 | Polcyn | |
| 5,931,901 A | 8/1999 | Wolfe et al. | |
| 5,937,164 A | 8/1999 | Mages et al. | |
| 5,940,840 A | 8/1999 | Eshel et al. | |
| 5,941,908 A | 8/1999 | Goldsteen et al. | |
| 5,941,954 A | 8/1999 | Kalajan | |
| 5,941,959 A | 8/1999 | Fishler et al. | |
| 5,944,789 A | 8/1999 | Tzelnic et al. | |
| 5,948,062 A | 9/1999 | Tzelnic et al. | |
| 5,953,005 A * | 9/1999 | Liu | 715/243 |
| 5,956,483 A | 9/1999 | Grate et al. | |
| 5,971,277 A | 10/1999 | Cragun et al. | |
| 5,978,828 A | 11/1999 | Greer et al. | |
| 5,987,523 A | 11/1999 | Hind et al. | |
| 5,991,399 A * | 11/1999 | Graunke et al. | 380/279 |
| 5,991,402 A | 11/1999 | Jia et al. | |
| 6,002,853 A | 12/1999 | De Hond | |
| 6,002,872 A | 12/1999 | Alexander, III et al. | |
| 6,006,251 A | 12/1999 | Toyouchi et al. | |
| 6,006,252 A | 12/1999 | Wolfe | |
| 6,006,328 A * | 12/1999 | Drake | 726/23 |
| 6,009,543 A | 12/1999 | Shavit | |
| 6,012,090 A | 1/2000 | Chung et al. | |
| 6,038,601 A | 3/2000 | Lambert et al. | |
| 6,044,471 A | 3/2000 | Colvin | |
| 6,052,780 A * | 4/2000 | Glover | 713/193 |
| 6,055,572 A | 4/2000 | Saksena | |
| 6,061,349 A | 5/2000 | Coile et al. | |
| 6,065,043 A | 5/2000 | Domenikos et al. | |
| 6,065,117 A | 5/2000 | White | |
| 6,067,585 A | 5/2000 | Hoang | |
| 6,067,622 A * | 5/2000 | Moore | 726/31 |
| 6,070,009 A | 5/2000 | Dean et al. | |
| 6,076,115 A | 6/2000 | Sambamurthy et al. | |
| 6,078,951 A | 6/2000 | Pashupathy et al. | |
| 6,085,185 A | 7/2000 | Matsuzawa et al. | |
| 6,088,718 A | 7/2000 | Altschuler et al. | |
| 6,088,796 A | 7/2000 | Cianfrosca et al. | |
| 6,098,056 A * | 8/2000 | Rusnak et al. | 705/75 |
| 6,098,067 A | 8/2000 | Erickson | |
| 6,101,549 A | 8/2000 | Baugher et al. | |
| 6,108,420 A * | 8/2000 | Larose et al. | 705/59 |
| 6,108,703 A | 8/2000 | Leighton et al. | |
| 6,112,239 A | 8/2000 | Kenner et al. | |
| 6,115,741 A | 9/2000 | Domenikos et al. | |
| 6,119,108 A | 9/2000 | Holmes et al. | |
| 6,119,165 A | 9/2000 | Li et al. | |
| 6,125,352 A | 9/2000 | Franklin et al. | |
| 6,138,158 A | 10/2000 | Boyle et al. | |
| 6,138,162 A | 10/2000 | Pistriotto et al. | |
| 6,141,684 A | 10/2000 | McDonald et al. | |
| 6,151,643 A | 11/2000 | Cheng et al. | |
| 6,154,878 A | 11/2000 | Saboff | |
| 6,163,806 A | 12/2000 | Viswanathan et al. | |
| 6,167,567 A | 12/2000 | Chiles et al. | |
| 6,169,805 B1 * | 1/2001 | Dunn et al. | 380/277 |
| 6,169,976 B1 * | 1/2001 | Colosso | 705/59 |
| 6,199,048 B1 | 3/2001 | Hudetz et al. | |
| 6,199,113 B1 | 3/2001 | Alegre et al. | |
| 6,202,056 B1 | 3/2001 | Nuttal | |
| 6,212,560 B1 | 4/2001 | Fairchild | |
| 6,212,564 B1 | 4/2001 | Harter et al. | |
| 6,216,173 B1 | 4/2001 | Jones et al. | |
| 6,226,618 B1 * | 5/2001 | Downs et al. | 705/1 |
| 6,226,680 B1 | 5/2001 | Boucher et al. | |
| 6,240,401 B1 | 5/2001 | Oren et al. | |
| 6,240,442 B1 | 5/2001 | Domenikos et al. | |
| 6,247,013 B1 | 6/2001 | Morimoto | |
| 6,249,528 B1 | 6/2001 | Kothary | |
| 6,260,066 B1 | 7/2001 | Bittinger et al. | |
| 6,272,673 B1 | 8/2001 | Dale et al. | |
| 6,279,001 B1 | 8/2001 | DeBettencourt et al. | |
| 6,282,573 B1 | 8/2001 | Darago et al. | |
| 6,295,639 B1 | 9/2001 | Van Der Meer | |
| 6,324,578 B1 | 11/2001 | Cox et al. | |
| 6,327,658 B1 | 12/2001 | Susaki et al. | |
| 6,334,189 B1 * | 12/2001 | Granger et al. | 726/26 |
| 6,335,138 B1 | 1/2002 | Kurose et al. | |
| 6,356,863 B1 | 3/2002 | Sayle | |
| 6,360,366 B1 | 3/2002 | Heath et al. | |
| 6,367,012 B1 * | 4/2002 | Atkinson et al. | 713/176 |
| 6,374,402 B1 * | 4/2002 | Schmeidler et al. | 717/167 |
| 6,385,596 B1 | 5/2002 | Wiser et al. | |
| 6,389,462 B1 | 5/2002 | Cohen et al. | |
| 6,405,111 B2 | 6/2002 | Rogers et al. | |
| 6,412,009 B1 | 6/2002 | Erickson et al. | |
| 6,421,726 B1 | 7/2002 | Kenner et al. | |
| 6,421,781 B1 | 7/2002 | Fox et al. | |
| 6,434,620 B1 | 8/2002 | Boucher et al. | |
| 6,442,538 B1 | 8/2002 | Nojima | |
| 6,453,334 B1 | 9/2002 | Vinson et al. | |
| 6,453,353 B1 | 9/2002 | Win et al. | |
| 6,471,068 B1 | 10/2002 | Kido et al. | |
| 6,502,137 B1 | 12/2002 | Peterson et al. | |
| 6,546,554 B1 | 4/2003 | Schmidt et al. | |
| 6,572,661 B1 | 6/2003 | Stern | |
| 6,578,199 B1 | 6/2003 | Tsou et al. | |
| 6,643,775 B1 * | 11/2003 | Granger et al. | 713/190 |
| 6,668,325 B1 * | 12/2003 | Collberg et al. | 713/194 |
| 6,711,622 B1 | 3/2004 | Fuller et al. | |
| 6,732,106 B2 | 5/2004 | Okamoto et al. | |
| 6,763,370 B1 * | 7/2004 | Schmeidler et al. | 709/203 |

| | | | |
|---|---|---|---|
| 6,771,290 | B1 | 8/2004 | Hoyle |
| 6,782,478 | B1* | 8/2004 | Probert ...................... 713/191 |
| 6,816,544 | B1 | 11/2004 | Bailey et al. |
| 6,868,495 | B1* | 3/2005 | Glover ...................... 713/190 |
| 7,010,697 | B2* | 3/2006 | Byrne et al. ................ 713/193 |
| 7,017,188 | B1* | 3/2006 | Schmeidler et al. ........... 726/26 |
| 7,100,192 | B1 | 8/2006 | Igawa et al. |
| 7,185,073 | B1 | 2/2007 | Gai et al. |
| 7,200,632 | B1 | 4/2007 | Greschler et al. |
| 7,225,264 | B2* | 5/2007 | Croman et al. .............. 709/232 |
| 7,370,071 | B2 | 5/2008 | Greschler et al. |
| 2001/0043215 | A1 | 11/2001 | Middleton et al. |
| 2005/0010670 | A1 | 1/2005 | Greschler et al. |
| 2005/0021613 | A1* | 1/2005 | Schmeidler et al. ......... 709/203 |
| 2006/0259949 | A1 | 11/2006 | Schaefer et al. |
| 2008/0189361 | A1 | 8/2008 | Greschler et al. |

FOREIGN PATENT DOCUMENTS

| | | |
|---|---|---|
| EP | 0866591 A1 | 9/1998 |
| WO | WO 97/14251 | 4/1997 |
| WO | WO 97/42762 | 11/1997 |
| WO | WO 99/27460 | 6/1999 |
| WO | WO 99/45491 | 9/1999 |
| WO | WO 00/46685 | 8/2000 |
| WO | WO 01/79971 | 10/2001 |
| WO | WO 98/07085 | 2/2008 |

OTHER PUBLICATIONS

Chandra Krintz et al., "Reducing Transfer Delay Using Java Class File Splitting and Prefetching, Proceedings of 14th SIPLAN conference on Object-oriented programming, systems, languages, and applications," Nov. 1999, 276-290.

Domel, P., "Mobile Telescript Agents and the Web," Digest of Papers of the Computer Society Computer Conference Compcon, US, Los Alamitos, *IEEE Computer Society Press*, Feb. 25, 1996, Conf. 41, 52-57.

Edwards, Mark Joseph, "Network Client and Workstation Concerns", http://windowsitlibrary.com/Content/121/08/4.html., Dec. 1997, 1-2.

Evans, E. et al., "Using Java Applets and Corba for Multi-User Distributed Applications," *IEEE Internet Computing*, May 1997 - Jun. 1997, 1(3), 43-55.

Harn, L. et al., "A Software Authentification System for Information Integrity," *Computers & Security*, Dec. 1992, 11, 747-752.

Hauptmann, S. et al., "On-line Maintenance with On-the-fly Software Replacement," *IEEE*, Aug. 1996, 70-71-80.

Higaki, H., "Extended Group Communication Algorithm for Updating Distributed Programs." *IEEE*, Jun. 1996, 386-393.

IBM & NEC to Cooperate in Establishing Common Standard to Prevent Illegal Copying of Digital Video Discs. Business Wire, Jul. 15, 1998.

IBM Announces Ground-Breaking Rights Management and Secure Payment Technology to Bring Leading Commercial Content Online, *Business Wire*, Oct. 31, 1995.

International Search report, Jul. 6, 2000, PCT/US99/27113.

James G. et al., "Automatic Prefetching in WAN," In *IEEE Workshop on Advances in Parellel and Distributed Systems*, Oct. 1993, 8-12.

Miller, G., "Firms Agree on Digital Anti-Piracy Technology," *L.A. Times*, Feb. 19, 1998, 117,pA1.

New Anti Digital Copying Techniques Being Developed. Telecomworldwide, Sep. 5, 1997.

Rubin, D. Aviel; "Secure Distribution of Electronic Documents in a Hostile Environment", *Computer Communications*, NL, Elsevier Science Publishers BV, Amsterdam, Jun. 1, 1995, 18(6), 429-434.

Zhong-Ren Peng, Ph. D., "An Assessment of the Development of Internet GIS," *URISA*, 1997.

* cited by examiner

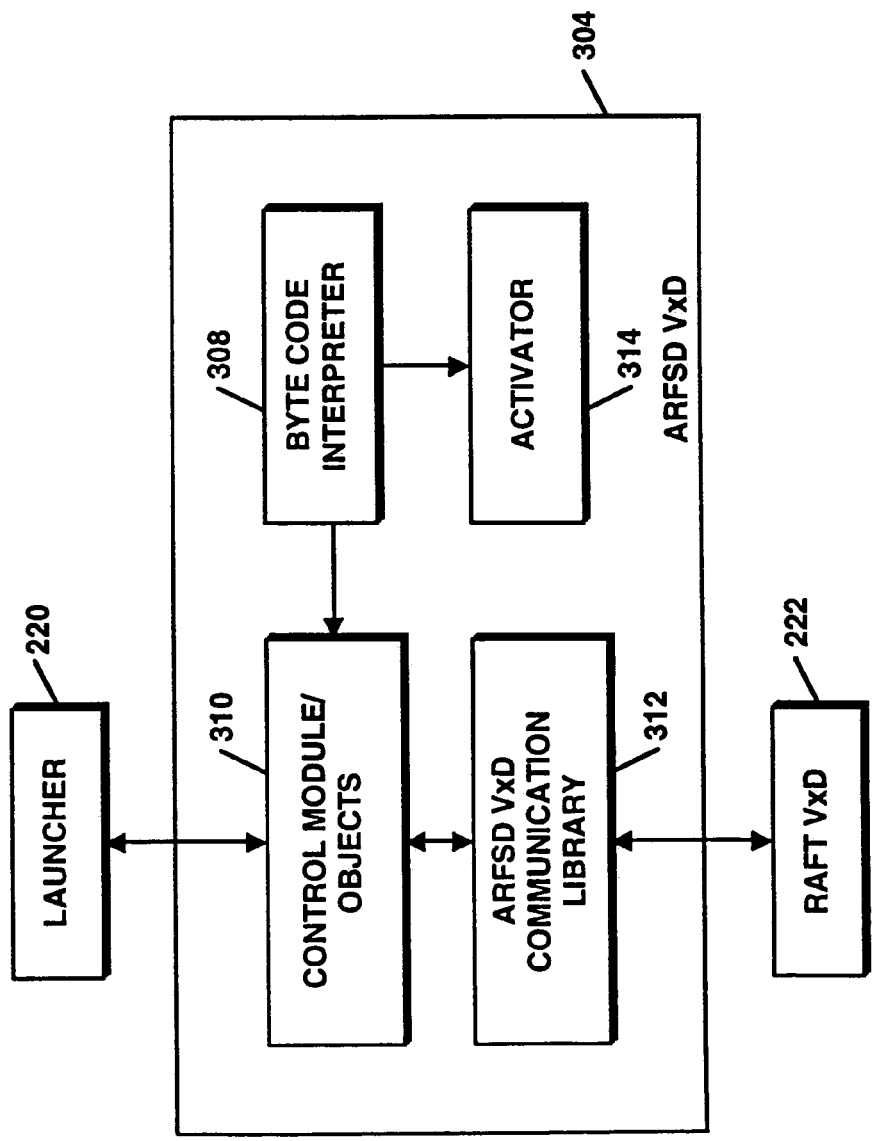

Figure 8

RAFT TOKEN 800

| URN 802 | LENGTH 804 | START TIME 806 | END TIME 808 | IP ADDRESS 810 | CAS SIGNATURE 812 |

Figure 9

LAUNCH STRING 900

| URN 902 | STORE ID 904 | GOODS TYPE 906 | SUBSCRIPTION DOMAIN 908 | AMOUNT 910 | CAS SIGNATURE 912 |

Figure 11

RAFT PACKET HEADER 1100

| PROCEDURE NUMBER 1102 | SEQUENCE NUMBER 1104 | PACKET LENGTH 1106 | STATUS 1108 |

METHOD AND APPARATUS FOR SECURE CONTENT DELIVERY OVER BROADBAND ACCESS NETWORKS

CROSS-REFERENCE TO RELATED APPLICATIONS

This application is a Continuation of and claims the benefit of U.S. Non-Provisional patent application Ser. No. 09/310,294, filed on May 12, 1999, which claims the benefit of U.S. Provisional Application Ser. No. 60/108,602, filed on Nov. 16, 1998, the entire contents of each of the above-referenced applications are incorporated herein by reference.

FIELD OF THE INVENTION

This invention relates generally to a method and system for distribution of data across networks, and, more specifically to a system for delivering executable software content over broadband access networks in a secure manner that enables on-demand subscription.

BACKGROUND OF THE INVENTION

The on-demand delivery of software applications and multimedia data types such as audio, video, animation, etc. has not been practical until recently primarily due to the rates at which data is transmitted across communication networks. The rate at which data, formatted into a series of bits, is transmitted is referred to as a bit per second (bps). Early modems were capable of transmitting information at a rate of approximately 300 bits per second. Thereafter, the speeds at which modems were capable of transmitting and receiving data increased. With such increases in modem speed, the nature of network topologies as well as the types of data transmitted across networks began to evolve. With modem speeds of 9600 bps and 1200 bps computer networks such as the Internet were primarily an ASCII text environment with specific protocols and text messaging. Subsequent increases in modem speed enabled more complex information to be accessed over the Internet and other computer networks. While ASCII text paradigm still exist on the World Wide Web portion of the Internet today, the more recent increased bandwidth environment has enabled communication of more complex content and multimedia data types.

More recently, high performance broadband technology and cable modems, with connectivity speeds in excess of 1 million bps, are being deployed and offered by cable, telephone, cellular and satellite enterprises worldwide. Current broadband access networks include the cable industry's shared medium Hybrid Fiber Coax (HFC) networks and the telephone industry's digital subscriber lines (xDSL).

With the advent of broadband technology and broadband access networks, complex multimedia data types and software titles, previously only available on Compact Disc Read Only Memory (CD-ROM) and Digital Versatile Disc (DVD), hereafter referred to as "title(s)," are now capable of being remotely accessed by subscribers to broadband access network services.

There are, however, factors other than data rates that also have made on-demand delivery of titles impractical. One such obstacle preventing on-demand delivery of content including software and multimedia titles to date has been the requirement to have the title loaded onto the subscriber's local computer system in order to execute the title. Further, the widespread copying of "pirating" of title content, and the associated security risks associated with distribution of fully enabled copies of titles, has made on-demand distribution unattractive to software publishers and content libraries.

Accordingly, a need exists for a method and system for on-demand delivery of executable software content, which does not require installation of the content on the subscriber's local computer system.

An additional need exists for a method and system to deliver content to subscriber's in an on-demand basis which provides security to protect the value of the content and which prevents unauthorized use and copying thereof.

An additional need exists for a method and system in which content may be delivered across broadband access network in a manner which meets the latency requirements of the content being executed.

SUMMARY OF THE INVENTION

The Secure Content Delivery Platform (SCDP) of the present invention delivers high-bandwidth executable content, on-demand, over broadband access networks. Using the SCDP platform, broadband subscribers, e.g. subscribers to cable modem and xDSL services, have access to titles across the broadband networks.

Users select a title to run from a virtual storefront, for example on the World Wide Web, which contains a virtual catalog of available titles. Upon selection of the title, the user negotiates for an actual purchase of the title. Negotiation includes user registration with a third party electronic commerce system (eCommerce), provision of user billing information, and selection of one of the purchase types offered with the selected title. Examples of possible purchase types may include 1) a time-limited demo of the title, 2) a single payment for a single use" of a title, 3) a single payment which allows unlimited "uses" of a title over some specified time period e.g., week, month, etc.

Upon completion of the purchase negotiation, SCDP client software running on the user's PC obtains an authorization token and keying material from a Conditional Access Server (CAS). The token authorizes the client process to run the selected title from a network file server accessible across the broadband network. The data retrieved from the file server is encrypted. The SCDP client process uses the keying material provided by the conditional access server to decrypt the data from the file server. With the present invention, titles run on the user's PC, but the title is not downloaded, in its entirety, onto the PC. A title is formatted into an electronic package that contains the title's files in a compressed and encrypted form, referred to hereafter as a briq. The briq is actually a portable, self-contained file system, containing all of the files necessary to run a particular title. Briqs are stored on a network file server, referred to hereafter as a RAFT server, accessible across a broadband network. The SCDP client treats the briq like a local file system on the user's PC. When running a title, the operating system, e.g. Windows, makes read requests to this local file system. The SCDP client, which, in the illustrative embodiment, includes a Windows Virtual Device Driver (VxD), services these requests by retrieving the requested blocks of briq data from the RAFT server. After retrieving the requested block of data, the VxD decompresses and decrypts the briq data, and passes the data onto the operating system on the user's PC.

In accordance with one aspect of the present invention, the software title is never "installed" on the target system. The SCDP client software creates an installation abstraction, maintaining the illusion for the operating system that the title currently executing is installed on the host PC. Thus, when execution of the title is terminated, there is no remaining evidence the title ran on the system. No files associated with the title are left on the PC's hard-drive, and no operating system state information e.g., registry variables associated with the title, remains. Users of titles have the option of saving certain state information that would be desirable to maintain across plays; e.g., the "level" achieved in a game, etc. Such state information may be saved in write-through file described hereinafter.

In accordance with another aspect of the present invention, the SCDP client software uses an inventive proprietary Random Access File Transport (RAFT) protocol to retrieve briq data across broadband network. The protocol provides SCDP clients with read-only access to files and directories stored on RAFT servers. Because the briq is treated like a local file system, the RAFT client does not need to be visible as an operating system drive and does not need to interface with the operating system's file system manager, the Windows Installable File System (IFS) Manager in the illustrative embodiment. As a result, the RAFT client file system driver, a VxD in the illustrative embodiment, is smaller and simpler than a remote or network file system driver. In addition, the RAFT protocol supports dynamic bandwidth restrictions, e.g., "bandwidth throttling", and access control through the use of RAFT authorization tokens.

In accordance with another aspect of the present invention, the SCDP employs a variety of security mechanisms to protect content from unauthorized access and replay. Authorization tokens and decryption keys are obtained from a conditional access server. Network communication between an SCDP client and CAS is protected via a secure remote procedure call (RPC) interface. Once a secure channel is established between SCDP client and CAS, the SCDP client requests a RAFT authorization token and keying material for the selected title. The authorization token is a signed message from the CAS indicating that the requesting user can have access to a specified briq, on a specific RAFT file server, for the length of time spelled out in the negotiated payment type.

While the RAFT authorization token gives an SCDP client access to a title's briq, the SCDP client must still unpack, e.g. decompress and decrypt, the briq to gain access to the title's file data. The CAS provides the user with the keying material necessary to decrypt briq data, however, the CAS does not directly provide the SCDP client with keying material. Instead, the CAS hides keying material from the user by embedding the keys in obfuscated bytecode that implements the decryption algorithm. Rather than delivering isolated keying material to the SCDP client, the CAS delivers obfuscated bytecode, referred to hereafter as an activator. The SCDP client's virtual device driver decrypts briq data by running the activator on a bytecode interpreter. Code obfuscation makes the activator difficult to reverse engineer, requiring a hacker to spend significant time and resources to extract the keying material from the activator, at a cost typically greater than the value of the content being protected. With the contemplated invention, activators are unique per client, per briq, per execution, i.e., each activator obtained from the CAS is different and usable for one time only thereby preventing the leveraging of a single, costly reverse engineering effort out to multiple users.

In accordance with the present invention, both the RAFT authentication tokens and activators have a limited lifetime. Authorization tokens include an expiration time, after which they are no longer valid. A running activator, at a certain point, initiates an exchange with the CAS to refresh itself. If the exchange is unsuccessful, the activator becomes inoperable and the title inoperable. The refreshing of activators is referred to hereinafter as activator keepalives. The keepalive mechanism results in the delivery of an update to the currently running activator, which may include new keys, data or even code. Authorization token refresh accompanies activator refresh. A new authorization token, along with the decryption keying data, is embedded within the new activator. At startup, the refreshed activator delivers a new RAFT authentication token to the RAFT VxD within the SCDP client.

SCDP system is media independent and will operate across any broadband networking technology, including HFC networks and the telephone industry's digital subscriber lines, provided sufficient bandwidth exists between the user and network file servers to satisfy the latency requirements of the currently executing CD title. The SCDP system may also be implemented using 10 Mbps and 100 Mbps Ethernet Local Area Networks, for example within enterprise network to deliver executable content over intranets as well.

According to a first embodiment of the invention, a method for securely delivering content over a network comprises the steps of: (a) storing at least one title on a content server operatively coupled to the network, the title stored in unexecutable form; (b) storing on an access server operatively coupled to the network a location identifier of the title and data necessary to process the title into executable form; (c) requiring a client process operatively coupled to the network to obtain the location identifier of the title from the access server prior to retrieving at least a portion of the title from the content server; and (d) requiring a client process to obtain from the access server the data necessary to process the portion of the title into executable form.

According to a second embodiment of the invention, an apparatus for secure delivery of over a network comprises: (a) a content server operatively coupled to the network and having at least one title stored therein unexecutable form; (b) an access server operatively coupled to the network and having stored therein a location identifier of the title and data necessary to process the title into executable form; and (c) a client system operatively coupled to the network and containing program logic configured to obtain from the access server the location identifier of the title and the data necessary to process the portion of the title into executable form.

According to a third embodiment of the invention, an apparatus for secure delivery of content over a network comprises: (A) a content server comprising a processor, a memory and a network interface for operatively coupling the content server to the network, the content server further comprising: (A.1) authentication logic, responsive to a token received from a client process, the token containing data identifying a time period and configured to determine whether the client process is authorized to access the memory at a specific time, and (A.2) access logic, responsive to the token received from the client process, the token containing data uniquely identifying one of the titles stored in the memory, for enabling access to the memory and the title uniquely identified by the token; (B) an access server comprising a processor, a memory and a network interface for operatively coupling the access server to the network, the access server further comprising: (B.1) conversion logic, responsive to a unique identifier of a title supplied by a client process and configured to convert the unique identifier of the title into a location identifier indicating an address on the network where the title may be accessed, and (B.2) activator generation logic responsive to a request from a client process and configured to generate an activator in response thereto; and (C) a client system comprising a processor, a memory and a network interface for operatively coupling the client system to the content server and the access server over the network, the client system further comprising: (C.1) program logic configured to obtain from the access server a token, an activator and a location identifier of the content server at which an identified title can be accessed, (C.2) program logic configured to retrieve at least a portion of the title from the content server, and (C.3) program logic configured to execute the portion of the title retrieved from the content server.

BRIEF DESCRIPTION OF THE DRAWINGS

The above and other features, objects and advantages of the invention will be better understood by referring to the following detailed description in conjunction with the accompanying drawing in which:

FIG. 3C is a conceptual block diagram of the ARFS VxD module of the SCDP client of FIG. 3A;

FIG. 8 is a conceptual diagram of RAFT token in accordance with the present invention;

FIG. 9 is a conceptual diagram of Launch String in accordance with the present invention;

FIG. 11 is a conceptual diagram of a RAFT packet header in accordance with the present invention;

DETAILED DESCRIPTION

The present invention is directed to Methods And Apparatus For Secure Content Delivery Over Broadband Access Networks. U.S. patent application Ser. No. 09/310,294, filed on May 12, 1999, was one of three U.S. patent applications filed on an even date herewith by Yonah Schmeidler, et al., including: U.S. patent application Ser. No. 09/311,923, (now U.S. Pat. No. 6,374,402 issued on Apr. 16, 2002), and U.S. patent application Ser. No. 09/310,229, (now U.S. Pat. No. 6,763,370 issued on Jul. 13, 2004). The entire contents of each of the above-identified patent applications and issued patents are incorporated herein by this reference.

Figure 1:
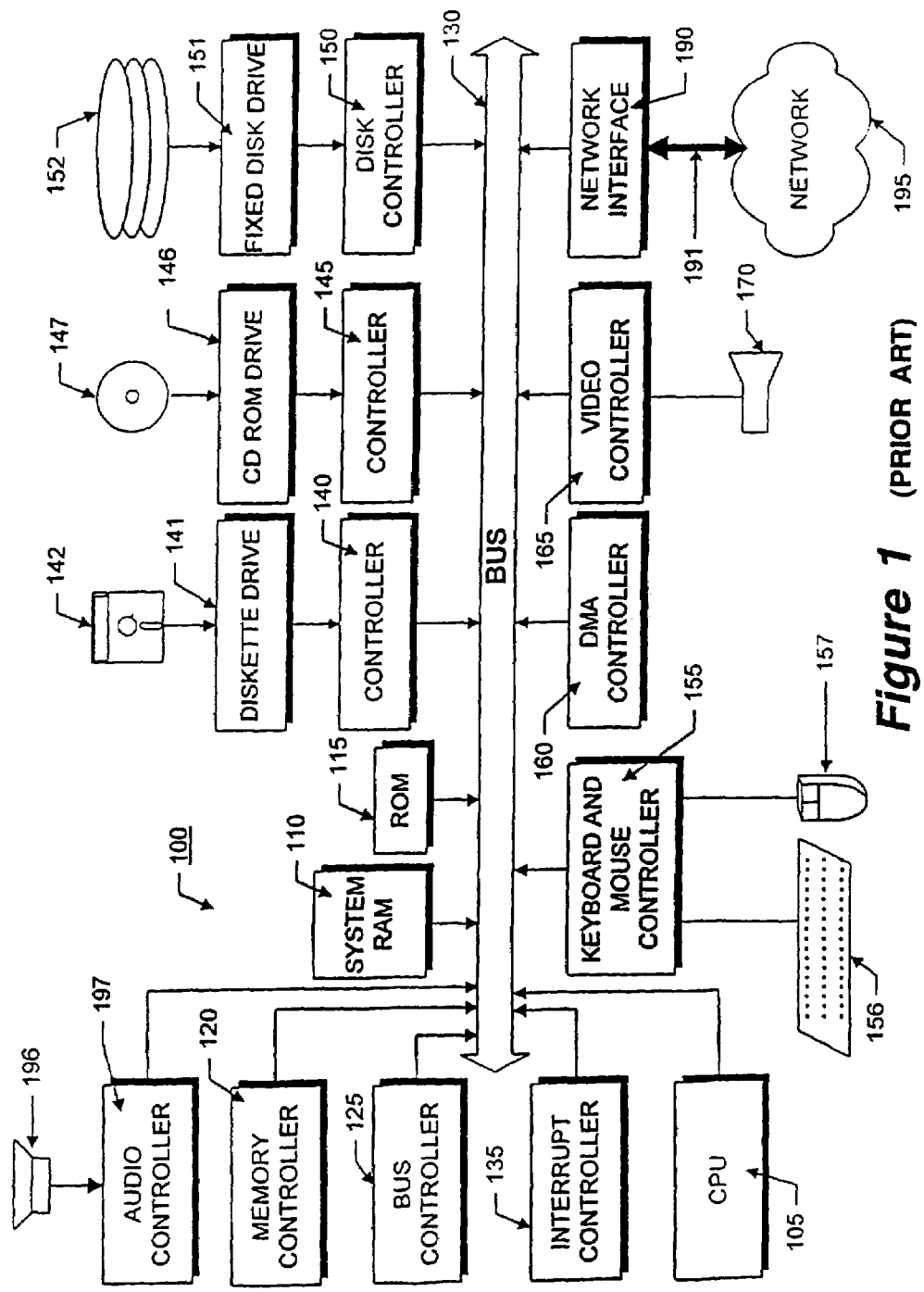
FIG. 1 is a block diagram of a computer system suitable for use with the present invention.

FIG. 1 illustrates the system architecture for a computer system 100 such as a Sun SparcStation 5 workstation, commercially available from Sun Microsystems of Palo Alto, Calif., or an IBM RS/6000 workstation or IBM Aptiva PC, both commercially available from International Business Machines Corp. of Armonk, N.Y., on which the invention may be implemented. The exemplary computer system of FIG. 1 is for descriptive purposes only. Although the description may refer to terms commonly used in describing particular computer systems, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adapter 190 which allows the system to be interconnected to a local area network (LAN) or a wide area network (WAN), schematically illustrated by bus 191 and network 195.

Operation of computer system 100 is generally controlled and coordinated by operating system software, such Windows 95 or Windows NT®, commercially available from Microsoft Corp., Redmond, Wash. The operating system controls allocation of system resources and performs tasks such as processing scheduling, memory management, networking, and I/O services, among things. In particular, an operating system resident in system memory and running on CPU 105 coordinates the operation of the other elements of computer system 100. The present invention may be implemented with any number of commercially available operating systems including OS/2®, UNIX®, Linux and Solaris®, among others. One or more browsers applications such as Netscape Navigator, version 2.0 and thereafter commercially available from Netscape Communications Corporation, and Internet Explorer, version 1.0 and thereafter, commercially available from Microsoft Corporation, Redmond, Wash., may execute under the control of the operating system.

SCDP System Overview

Figure 2A:
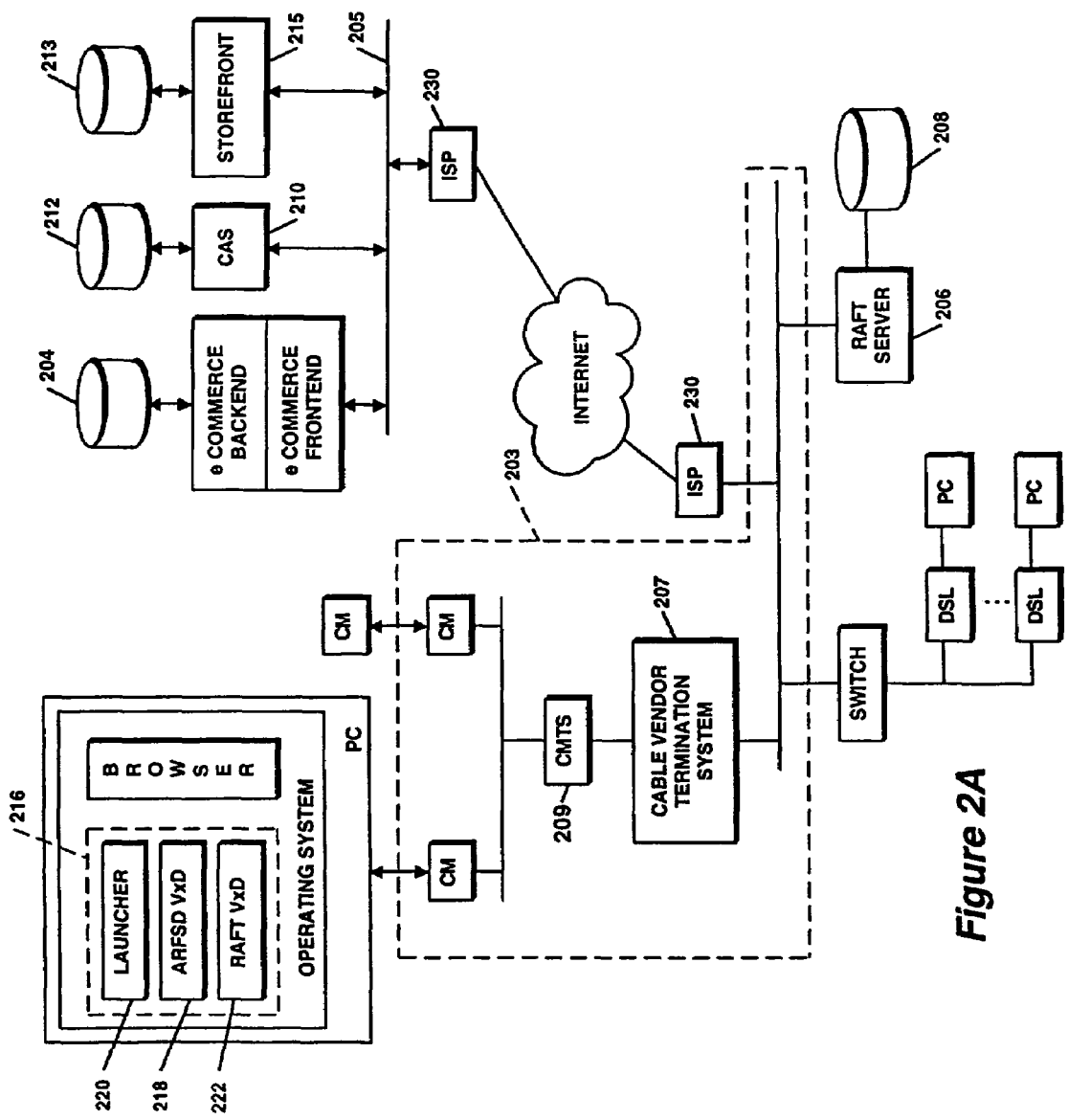
FIG. 2A is a conceptual block diagram of a broadband network in which the secure content delivery system of the present invention may be implemented.

FIG. 2A illustrates conceptually the main components of a Secure Content Delivery Platform (SCDP) system 200 in accordance with the present invention, as well as other elements in a broadband network environment, such environment being for exemplary purposes only and not to be considered limiting. The elements illustrated in FIG. 2A are to facilitate and understanding of the invention. Not every element illustrated in FIG. 2A or described herein is necessary for the implementation or operation of the invention. As illustrated in FIG. 2A, SCDP system 200 comprises a Conditional Access Server (CAS) 210, an associated CAS database 212, a Random Access File Transfer Server (RAFT) 206, a RAFT database 208 and SCDP client 216.

In addition to CAS Server 210, RAFT Server 206 and SCDP Client 216, the present invention contemplates use of a virtual store front 215 and eCommerce Server 202. eCommerce server 202 has an accompanying billing database 204. Store front 215 has an accompanying database 213. In the illustrative embodiment, servers 202, 210 and 215 are connected over a private, secure local area network (LAN), such as a local ethernet network. The LAN is, in turn, is connected to a global computer network topology, illustrated as Internet cloud 240 in FIG. 2A, by an Internet service provider (ISP) 230. Any number of commercially available Internet access service providers such as MCI WorldCom, AT&T, America OnLine, etc. may be used as ISP 230. In the illustrative embodiment, although servers 202, 210 and 215 are illustrated as being connected through a private local area network, it will be obvious to those skilled in the arts that such servers may be operatively coupled over other non-private networks, such as the Internet. In addition, eCommerce server 202 may be coupled to a credit processing server of a financial or banking institution (not shown) to assist in processing of credit card and/or other types of transactions.

Referring again to FIG. 2A, one or more client PCs having an architecture similar to that of FIG. 1, are connected to the SCDP system 200 over a broadband access network 203 and cable provider 207. In the illustrative embodiment, a cable modem (CM) connects to the host PC on which the SCDP client is executing. In turn, a plurality of cable modems are coupled to a cable node via a high frequency connection. Typically, as many as 1,000 host PCs may be connected to a cable node through appropriate cable modems and high frequency connections. Each cable node is, in turn, connected through a cable modem termination system (CMTS). A plurality of cable modem termination systems are coupled to a termination headend. A plurality of interconnected headends comprise the backbone of the broadband access network. The cable headends are typically located at the cable company facilities and may include a host data terminal connected to an Internet Protocol (IP) network through a T1 line or other connection. The T1 line, may be, in turn, connected to the Internet through an Internet Service Provider (ISP) 230. RAFT server 206 and its accompanying database 208 are coupled to the broadband access network 203 between the Internet Service Provider 230 and the host data termination facility or head end provided by the cable company. In this manner, the RAFT Server 206, although part of the SCDP System 200, is located remotely from the CAS 210, eCommerce Server 202, and virtual store front 215. The cable modem termination system 209 converts high frequency data from a cable infrastructure into Internet Protocol format using the published Data Over Cable Service Industry Standard (DOCSIS).

Alternatively, a client PC may be connected to SCDP system 200 via a digital subscriber line (DSL) service, as illustrated in FIG. 2A. In this configuration, a host computer on which the SCDP client is executing is coupled to a telephone company switch via a DSL modem and existing public switch telephone network infrastructure.

The construction of DSL subscriber networks and broadband access networks are known in the art and are currently used by cable companies and telephone companies extensively and will not be described in further detail here for the sake of brevity. Accordingly, not every element of the above described systems is illustrated in FIG. 2A.

Subscription Process

Figure 2B:
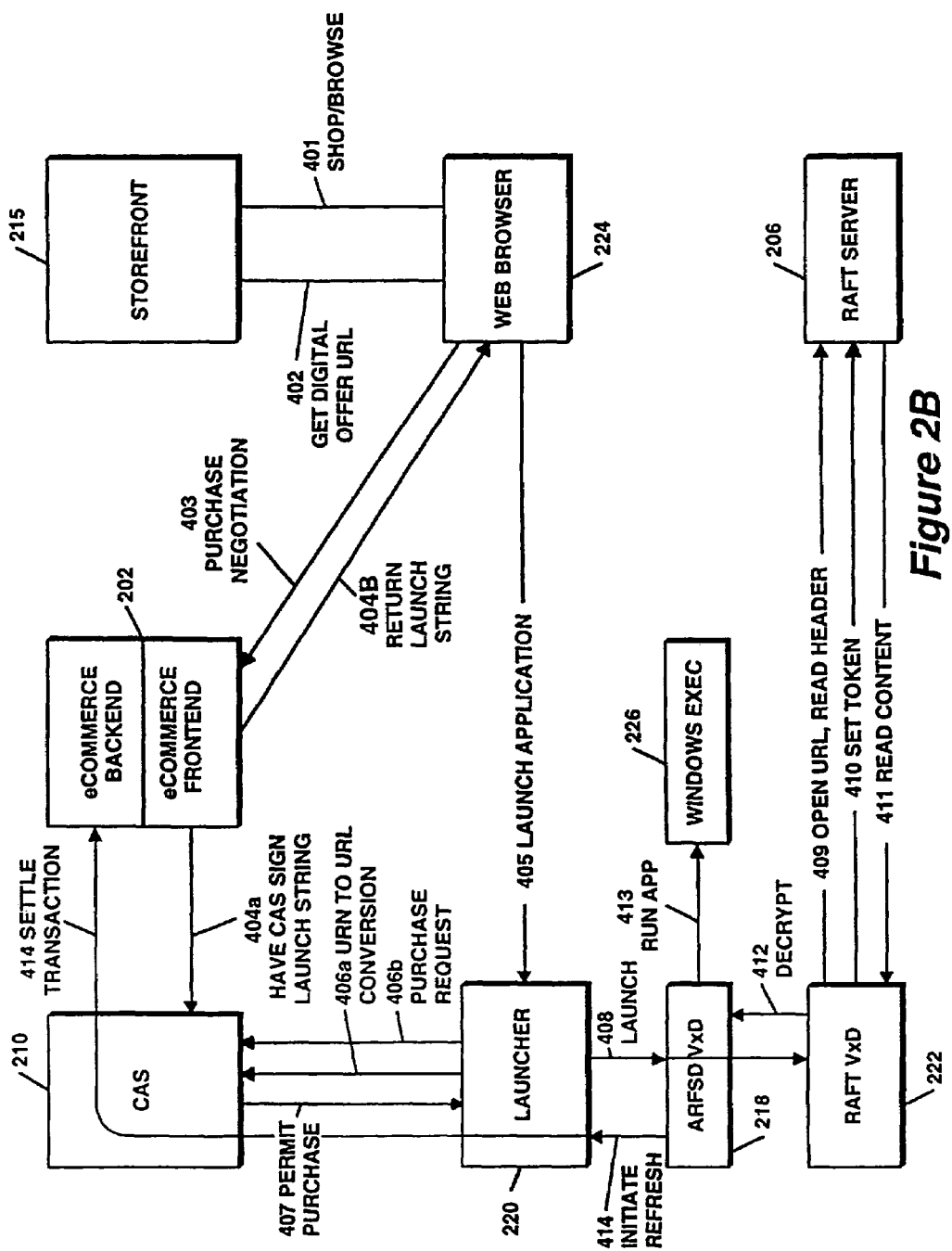
FIG. 2B is a conceptual block diagram illustrating the elements of the inventive system and the interaction with other network elements in accordance with the present invention.
Figure 4A:
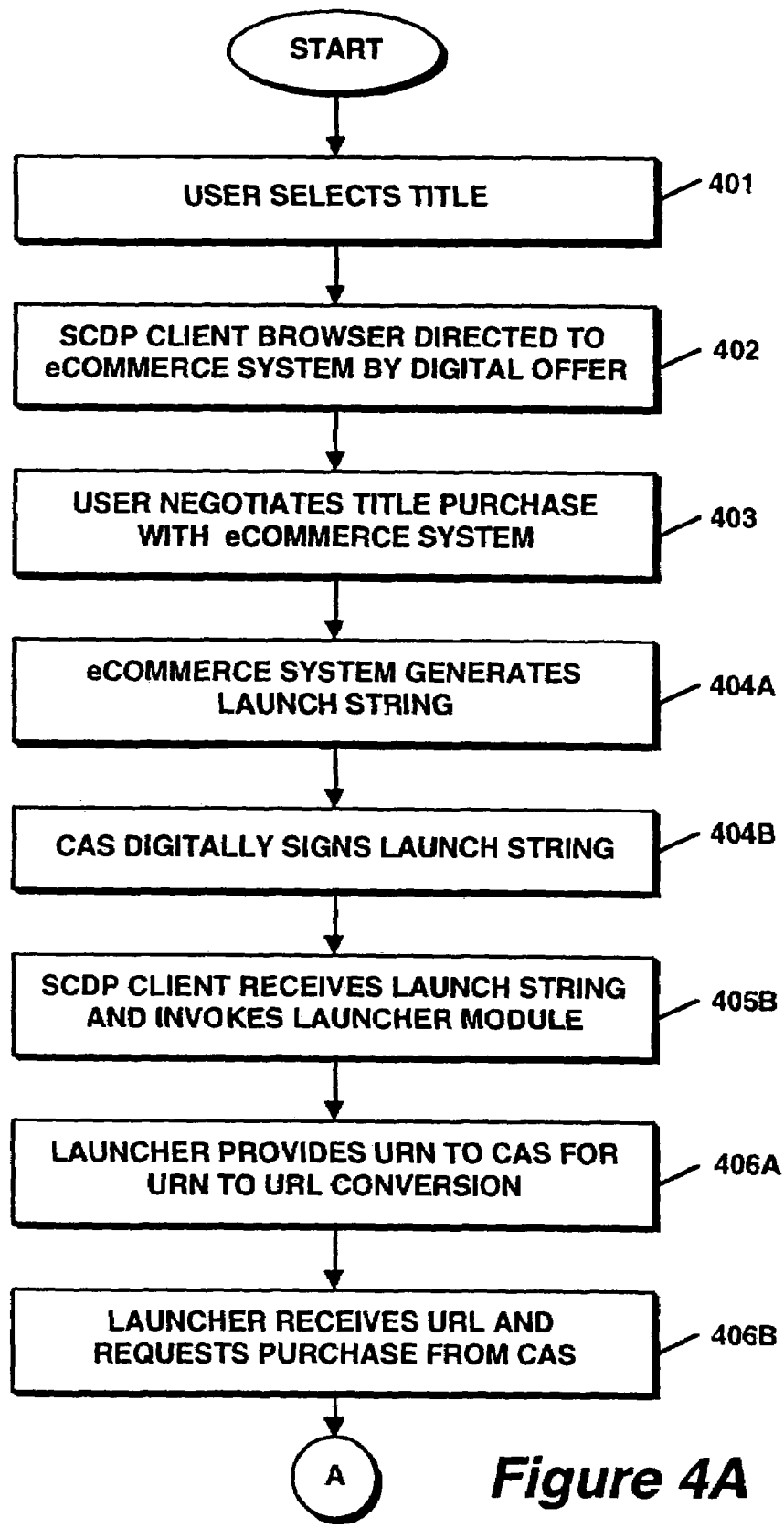
FIGS. 4A-B collectively form a flowchart illustrating the process of subscribing to content and launching a title in accordance with the present invention.
Figure 4B:
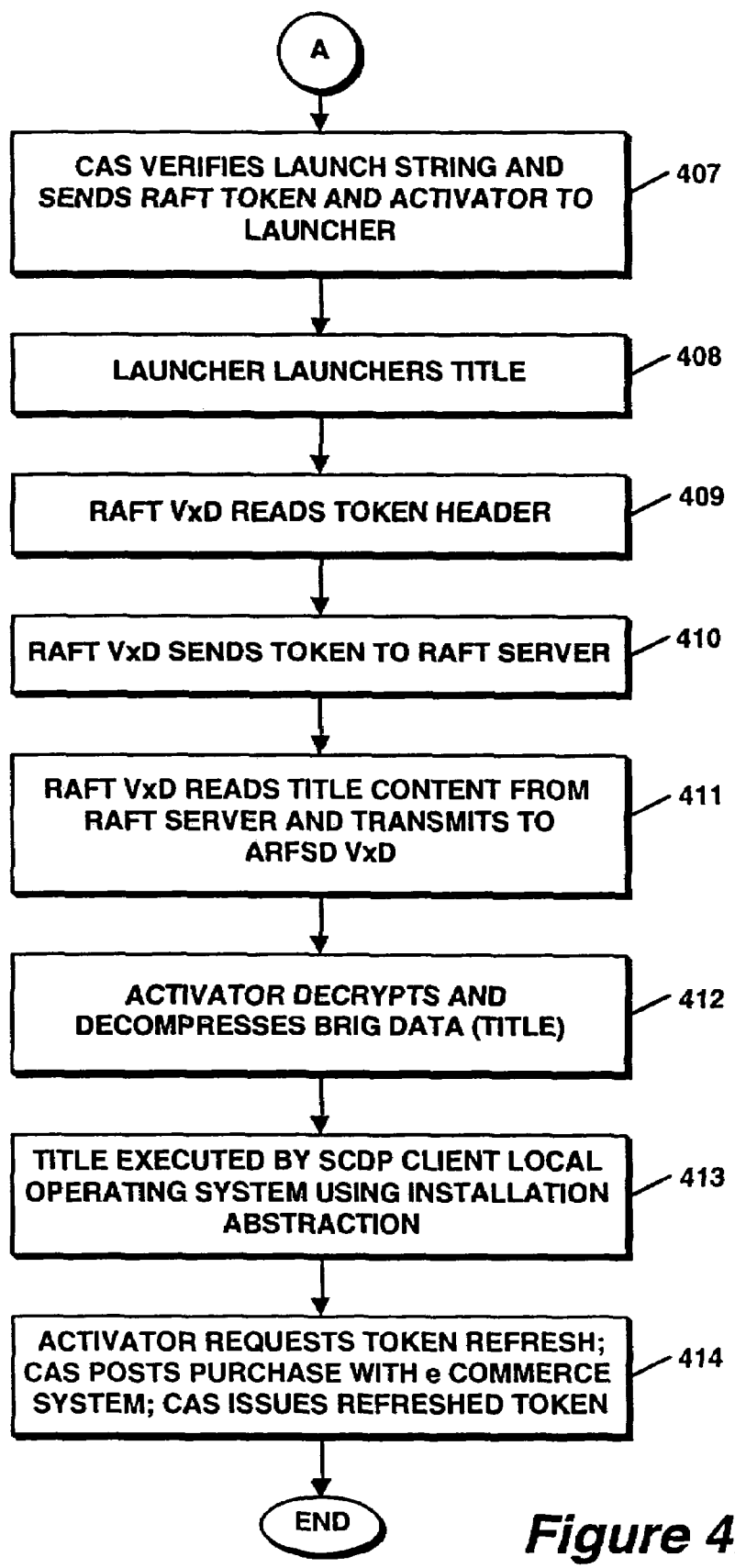

FIG. 2B illustrates conceptually the interaction of the components within the SCDP system 200. The flowchart of FIGS. 4A-B in conjunction with the conceptual block diagram of FIG. 2B illustrates the procedural steps performed by the SCDP system 200 during the subscription and launch processes in accordance with the present invention.

A user equipped with the SCDP client 216 executing on a PC and an HTML browser e.g., Netscape Navigator or Microsoft Internet Explorer, selects a title from the virtual storefront 215, as illustrated by step 401. On the storefront 215, each available title is posted as a digital offer embedded within a Universal Resource Locator (URL). The digital offer contains information identifying the selected title and purchase type. Selecting the digital offer directs the subscribers browser to the HTTP front-end 202A of the eCommerce server 202, as illustrated by step 402. The user negotiates with the eCommerce server 202 for a purchase based on the information in the digital offer URL, as illustrated by step 403. The negotiation may typically involve user registration and the provision of credit information.

The eCommerce server generates a launch string, containing the information identifying and authorizing the purchase, including a Universal Resource Name (URN) uniquely identifying the desired content, as illustrated by step 404A. The format and description of the URN and launch string are described hereinafter. The launch string is digitally signed by the CAS 210 and provided to the eCommerce service 202 for delivery to the SCDP client 216, as illustrated by step 404B.

The launch string is wrapped with a MIME (Multipurpose Internet Mail Extension) header. When the launch string is received by the SCDP client's browser 224, the MIME type associated with the launch string is located in a registry entry, which results in the invocation of the launcher module 220 within the SCDP client 216, as illustrated by step 405. The Launcher 220 establishes a secure RPC connection with the CAS 210 and requests that CAS provide a URL for the specified URN, i.e. a URN to URL conversion, as illustrated by step 406A. The URL identifies the location of the corresponding briq data. The CAS 210 forwards the corresponding URL to the Launcher 220. Once the Launcher has identified the location of the corresponding briq data, the Launcher sends a purchase request to the CAS, the purchase request including the Launch string, as illustrated by step 406B.

The CAS verifies the launch string's signature, and then returns a RAFT authorization token and activator to the Launcher, as illustrated by step 407. The activator and authorization token are described hereafter in greater detail. The authorization token may be actually embedded within the activator. Next, the Launcher launches the title by passing the activator to the ARFSD VxD 218, as illustrated by step 408. The ARFSD VxD runs the activator which passes the RAFT authorization token to the RAFT VxD 222. The RAFT VxD opens the URL and reads the header, as illustrated by step 409. The RAFT VxD sends the initial authorization token to the RAFT Server, as illustrated by step 410. The RAFT VxD 222 starts reading content from RAFT server 206, passing the received content back to the ARFSD VxD 218, as illustrated by step 411. The ARFSD VxD uses the activator to decrypt and decompress the content in the form of briq data, and perform integrity checking on the blocks of decrypted data, as illustrated by step 412.

Thereafter, the operating system executes the title, via the local filesystem presented by ARFSD VxD, as illustrated by step 413. Periodically, the activator requests the launcher 220 to ask the CAS 210 to refresh the activator and the RAFT authorization token. Upon the first of such requests, the CAS posts the purchase to the eCommerce server 202 for transaction settlement, as illustrated by step 414. The lifetime of the first activator may be on the order of minutes. Successful activator refresh after the first timeout serves as an indication that the title is running successfully.

Having provided an overview of the system components and their interaction, a more detailed description of the inventive secure content delivery system 200 and the processes performed thereby are set forth with reference to FIGS. 3A-14 and their accompanying explanations.

SCDP Client

Figure 3A:
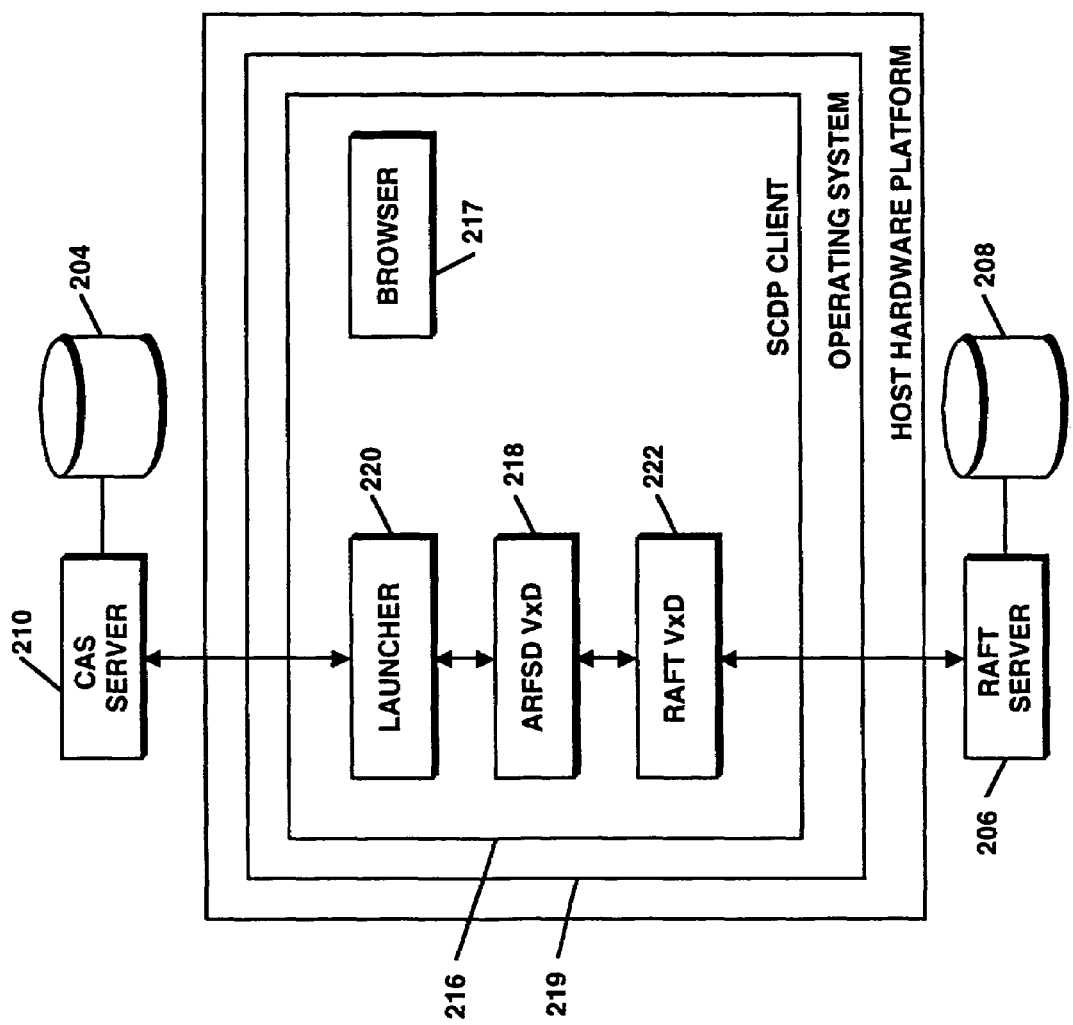
FIG. 3A is a conceptual block diagram of the SCDP client in accordance with the present invention.

Referring to FIG. 3A, a conceptual block diagram of the SCDP client 216 in accordance with the present invention is illustrated. The SCDP client 216 allows users to run briq-encoded titles on a host PC. As illustrated in FIG. 3A, the SCDP client comprises Launcher 220, Arepa File System Driver VxD (ARFSD VxD) 218, and RAFT Client VxD 222. The SCDP client 216 may be implemented as an application executable on operating system 219, e.g., a Windows® application in the illustration embodiment. Operating system 219 is executable on top of a PC architecture, such as an IBM PC or other computer architecture, as described with reference to FIG. 1. In addition to SCDP client 216, a browser 217, typically an HTML browser such as NetScape Navigator or Microsoft Explorer, may also be running under the control of operating system 219. Launcher 220, ARFSD VxD 218 and RAFT VxD 222 are described in greater detail with reference to FIGS. 3B-D, respectively.

Figure 3B:
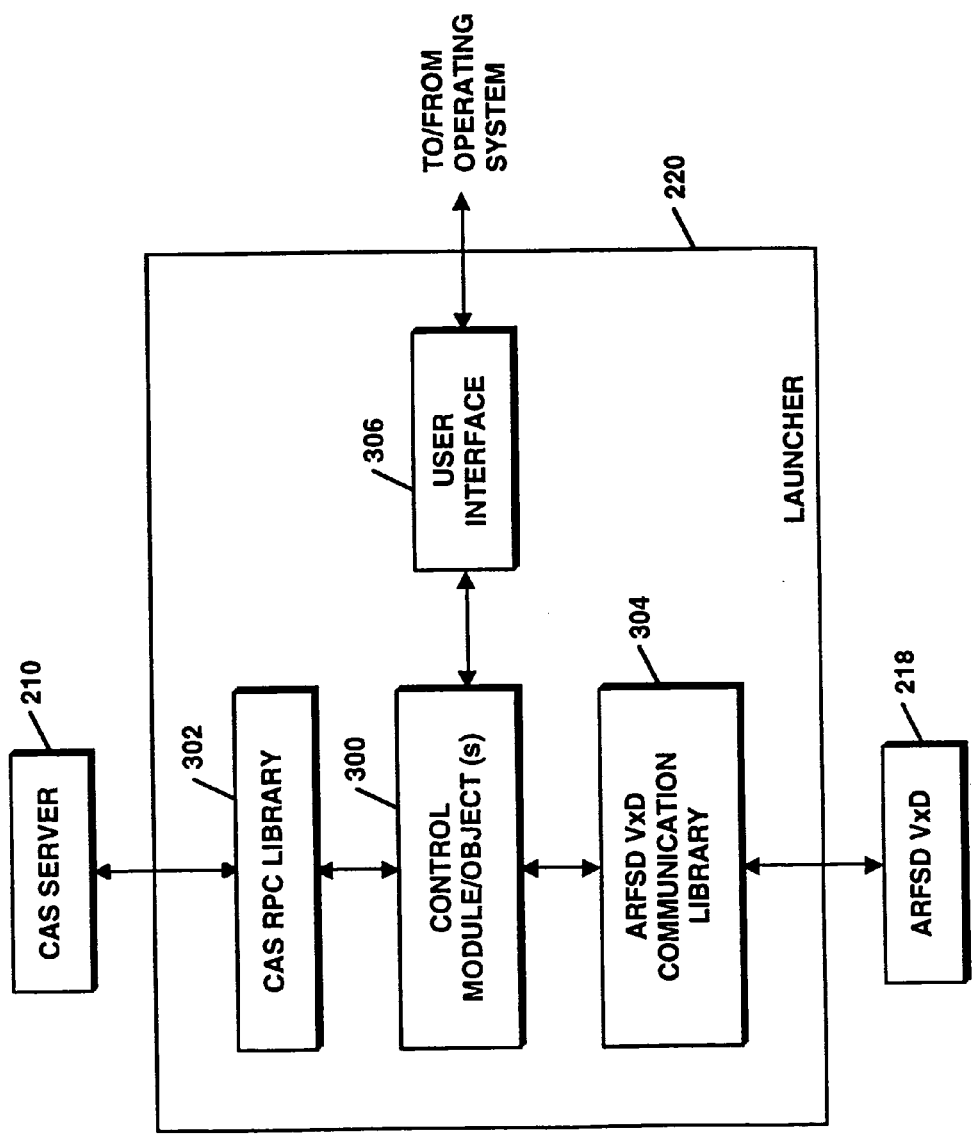
FIG. 3B is a conceptual block diagram of the launcher module of the SCDP client of FIG. 3A.

FIG. 3B illustrates conceptually a block diagram of the program logic modules comprising Launcher 220 of SCDP client 216. Specifically, Launcher 220 comprises a control module 300, a CAS RPC library 302, a ARFSD VxD communication library 304 and a user interface 306. In the illustrative embodiment, the Launcher 220 may be implemented as a Windows application containing logic which coordinates all communication between the SCDP client and the CAS 204. The Launcher 220 is invoked by the client's web browser 217, upon completion of purchase negotiation with the eCommerce system 202. The eCommerce system delivers the client web browser a launch string with MIME type associated with the Launcher. In addition, the Launcher manages all communications with the CAS, including 1) obtaining from the CAS the address of the RAFT server and the briq path name corresponding to the selected title; 2) obtaining from the CAS a RAFT authorization token and activator necessary to retrieve briq data from the RAFT server and to decrypt the retrieved data; and 3) asking the CAS to refresh the RAFT authorization token and the activator.

Figure 12:
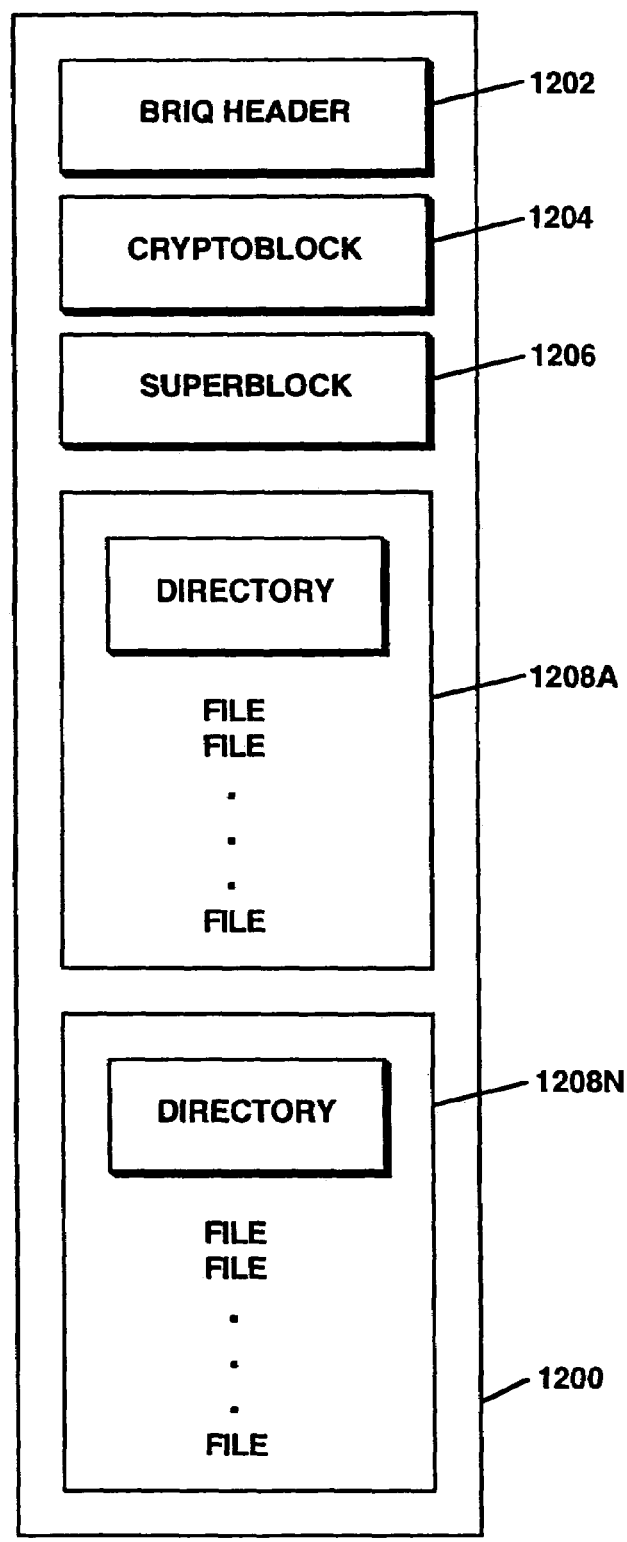
FIG. 12 is a conceptual diagram of a briq data package in accordance with the present invention.

To facilitate communication between the CAS server 206 and the ARFSD VxD module 218, Launcher 220 includes CAS RPC Library 302, which may be implemented as a series of objects or program code which generate and receive communications to/from the CAS server 206 through a remote procedure call (RPC) library. One such RPC library suitable for use as module 302 is the NobleNet Secure RPC Product commercially available from Noblenet, Inc. Optionally, a network transport product, such as those adhering to the Secure Socket Library (SSL) standard published by Netscape Communications Corporation, may be used to transport the RPC calls across the network and thereby further enhance the security of transmissions to/from the SCDP client in the inventive system. A communication library is also utilized for communications between the launcher module 220 and the ARFSD VxD module 218 and between ARFSD VxD module 218 and RAFT VxD 222. Such library again includes code or objects necessary to communicate data between the Launcher 220 and the VxD 218. For example, as described in greater detail hereinafter, selected information from the briq header 1202 of briq 1200, as illustrated in FIG. 12, is read by the control module 300 and supplied to VxD 218 through the communication library 304, during execution of a title.

Upon invocation of launcher 220, a graphic user interface (GUI) is presented to a user through user interface 306. In the illustrative embodiment, user interface 306 includes the appropriate program logic and/or objects necessary to interface with the operating system interface and application program interfaces (APIs) contained within the Windows operating system in order to render windows, present graphic information within such windows, and receive commands from a user via a keyboard, mouse or other pointing device, such user interface being well within the scope of those reasonably skilled in the art. Through this GUI, the user may set user preferences, e.g., disk cache size, and be notified of error conditions.

Control module 300 may be implemented with the appropriate code or objects to carry out the algorithm necessary to launch a title and continue communications between the SCDP client 200 and the CAS 210 and the RAFT server 206. More specifically, the algorithms executed by control module 300 are illustrated in greater detail in FIGS. 4A-6 and their accompanying descriptions.

FIG. 3C is a conceptual block diagram of the ARFSD VxD 304 of FIG. 3B. VxD 304 comprises a byte code interpreter 308, a control module 310 and a ARFSD VxD communication library 312. The ARFSD VxD 304 is a virtual device driver enables the operating system to read the briq data as a local file system. ARFSD VxD 304 decompresses and decrypts briq data. In addition, ARFSD VxD maintains the installation abstraction, e.g., supplying Windows registry information. The ARFSD VxD implements dynamic registry entries by intercepting all operating system registry access calls and then simulating registry entries that are associated with the running title, but not saved on disk.

Activators and the Bytecode Interpreter

As described previously, the activator 228 executes on the bytecode interpreter 308 embodied in the ARFSD VxD 304. The activator represents a portion of the SCDP client software which is obtained from the CAS 210, and, which the ARFSD VxD 304 employs to decrypt briq data. The form and content of the activator as described in greater detail with reference to FIG. 13. Activators implement a keepalive mechanism that requires the activators to periodically ask the CAS 210 for replacement activators. Thus, communication with the CAS must be maintained in order continue running of a title. In the illustrative embodiment, the keepalive mechanism within activator 228 may be implemented as a numeric string or as otherwise described with reference to FIG. 13.

The activator is implemented as a dynamic bytecode object that can be run within the ARFSD VxD 304. The CAS generates activators through calling the activator generation routines which may be resident in an external library, as previously described with reference to Activator Factory module 710 of FIG. 7. The RAFT token, discussed above, is packaged with the activator. The activator eventually will time out, after which the SCDP client 216 must call the CAS and request a new activator. The life of the activator is determined by the start time and end time data values contained within the token portion of the activator.

The SCDP system 200 uses activators to protect the release of cryptographic material to the SCDP client 216. An activator may be implemented as a piece of obfuscated bytecode that is run inside the ARFS VxD 304 and enables decryption of a briq. Once the activator is downloaded, it may make further RPCs to the CAS 210 to finalize the delivery of the keying material. Code obfuscation within the activator may protect against extracting the keys.

The illustrative implementation of activators also utilizes remote execution to protect keys in the activator. Remote execution makes the activator incomplete, i.e. gives the activator enough information to continue operation for a limited period of time and then requires the activator to request further code or data. The bytecode interpreter 308 within the ARFSD VxD 304 comprises program logic, code or objects which extract the cryptographic key data from the activator. In the illustrative embodiment, the activator may have the format and content as described with reference to FIG. 13.

In alternative embodiments, which utilize more sophisticated activator implementations in which the activator contains obfuscated bytecodes, the bytecode interpreter 308 within the ARFSD VxD 304 may be implemented with a rich instruction set, to increase the opportunities for simple obfuscation. Note that there are no traditional limits of hardware implemented microprocessor instruction sets, and thus many bits for addressing modes and instruction formats can be used. The complexity and secrecy of such instruction set allows secure delivery content within the SCDP system. Since the bytecode runs inside a VxD, the bytecode interpreter 308 may call exported interfaces from other VxDs but does not need to call WIN32 functions from the operating system or handle DLLs.

Byte code interpreter 308, in the illustrative embodiment, is implemented as a virtual machine having the appropriate code and/or program logic necessary to interpret and execute the byte codes contained within an activator received from the CAS 210. Such a virtual machine includes the appropriate routes to interpret the byte code(s), store any temporary data from the byte code stream, and execute the processes identified by the byte code(s). The specific implementation of byte code interpreter 308, therefore, depends on the byte code set executable by the interpreter. For example, byte code interpreter 308 may implement a number of specific features in order to accommodate the type of code which activators contain, including any of the following:

Bitwise Operators—Shift, rotate, and "extract bits" functions which are useful for cryptographic and marshalling routines;

Eval—explicit "call into data" that lets the bytecode interpreter interpret downloaded or modified bytecodes, thereby avoiding separation of code and data and corresponding flags and data protection; or Interfacing Primitives—The SCDP client bytecode interpreter calls functions in other VxD's directly, including argument marshalling and internalizing a particular predefined set of C types. Both the SCDP client and CAS utilize Secure Stream Interfacing primitives, e.g., hooks to extract connection data, in particular authentication data, from the stream to which the activator or technique is attached.

It will be obvious to those skilled in the arts that byte code interpreter 308 may also be implemented as a physical machine. In the simplest activator implementation described herein, bytecodes are optional. Accordingly, byte code interpretor 308 may optional as well.

Communication library 312 is utilized for communications between the ARFSD VxD module 218 and the RAFT VxD module 222. Such library is similar to communication library 304 of FIG. 3B and facilitates communications between VxDs 218 and 220.

Control module 310 includes the necessary program logic or code to carry out the algorithm necessary to perform the installation abstraction, execute a title and refresh a RAFT token. More specifically, the algorithms executed by control module 310 are illustrated in greater detail in FIGS. 4A-6 and their accompanying explanations.

Figure 3D:
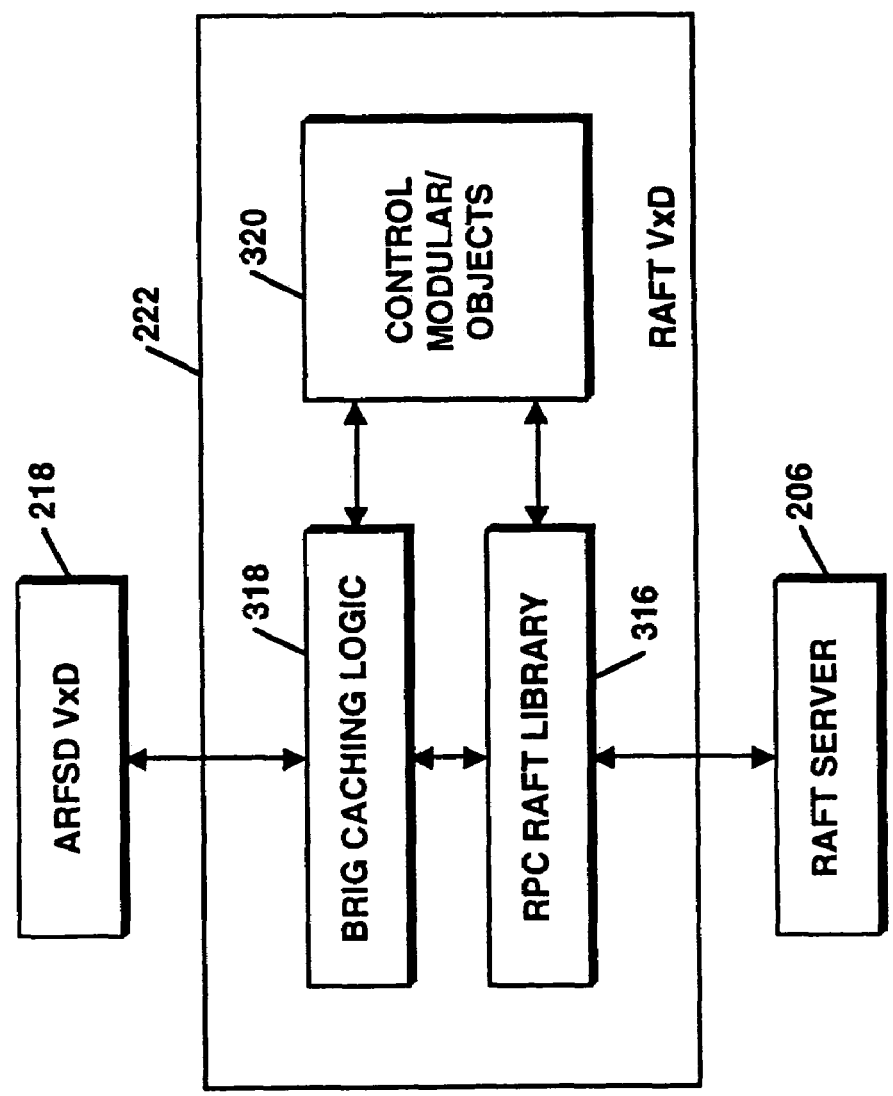
FIG. 3D is a conceptual block diagram of the RAFT VxD module of the SCDP client of FIG. 3D.

FIG. 3D illustrates conceptually a block diagram of the components comprising the RAFT VxD 222 of SCDP client 216. Specifically, VxD 222 comprises a RAFT RPC library 316, caching logic 318 and a control module 320. The RPC library 316 contains the appropriate code and/or objects which implement the client side RPC layer of the RAFT protocol, described in greater detail herein. Such program logic is utilized to communicate with the RAFT server 206 utilizing one of the RAFT protocol messages. Specifically, module 316 contains the logic necessary to append a RAFT packet header, as described with reference to FIG. 11, to each RAFT protocol message and to respond with the appropriate of the RAFT protocol messages. Caching logic 318 contains the appropriate code to perform caching of briqs, or portions thereof, retrieved from the RAFT server 206 using the RAFT protocol. The portions of the briqs cached by module 218 may be stored in a portion of temporary memory on the host PC on which the SCDP client 216 is executing. The particular caching technique and its associated logic may be implemented in accordance with any number of a plurality of known caching algorithms, readily within the understanding of those reasonably skilled in the arts. Control module 320 may be implemented to include the necessary program logic, code and/or objects to oversee the previously described functions with respect to modules 316 and 318 and to execute the method steps described with reference to FIGS. 4A-6.

Running a Title

Figure 5A:
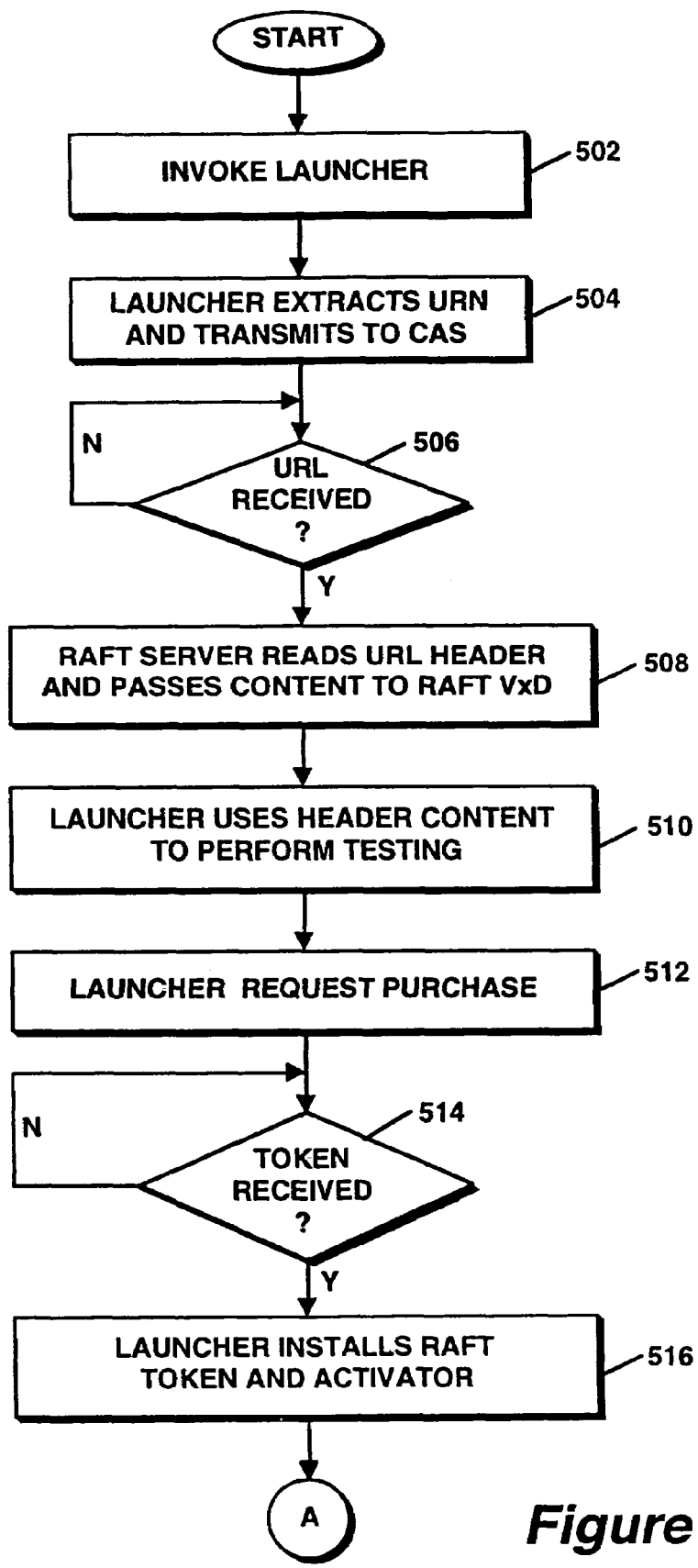
FIGS. 5A-C collectively form a flow chart illustrating the process steps performed by the SCDP client in accordance with the present invention.
Figure 5B:
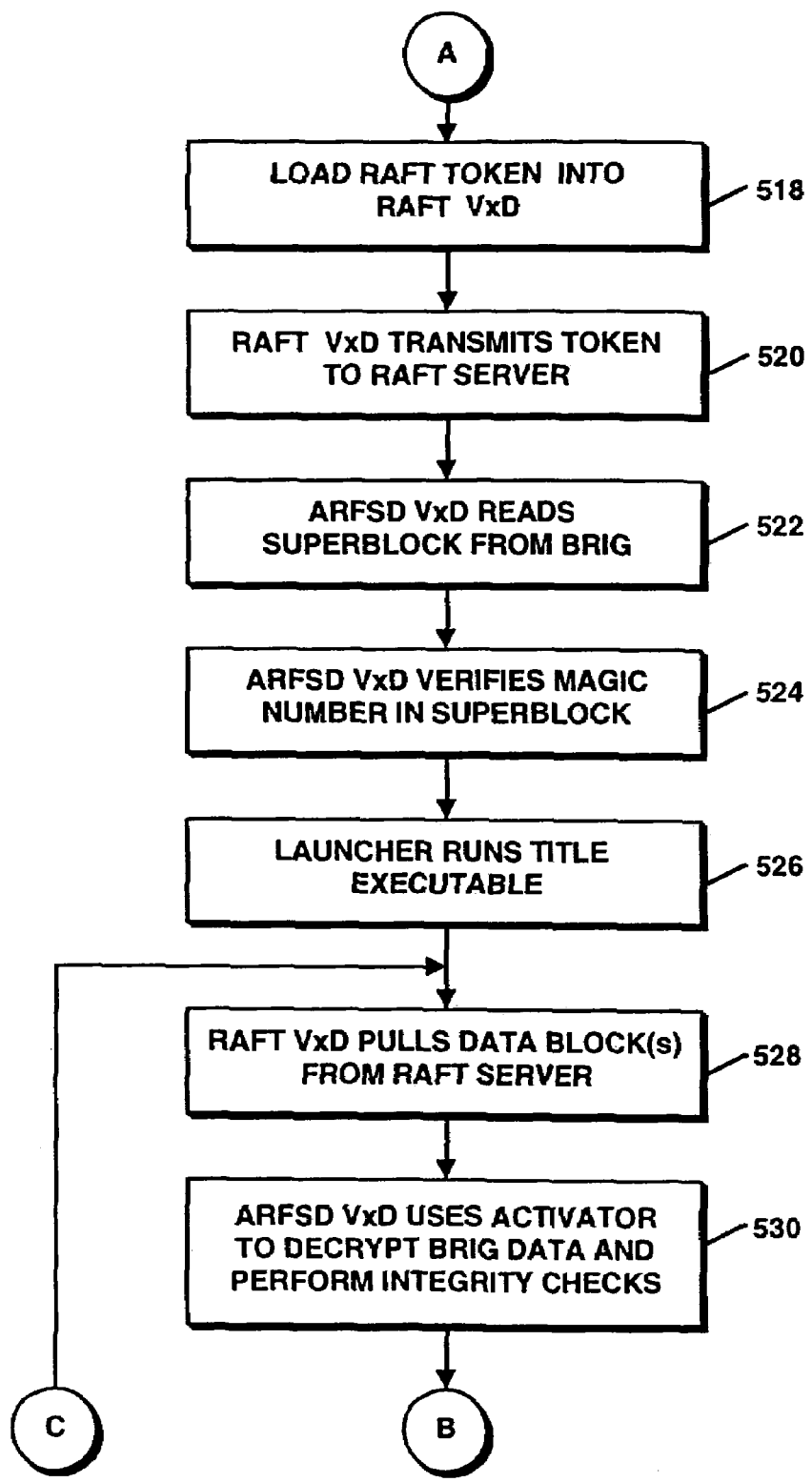
Figure 5C:
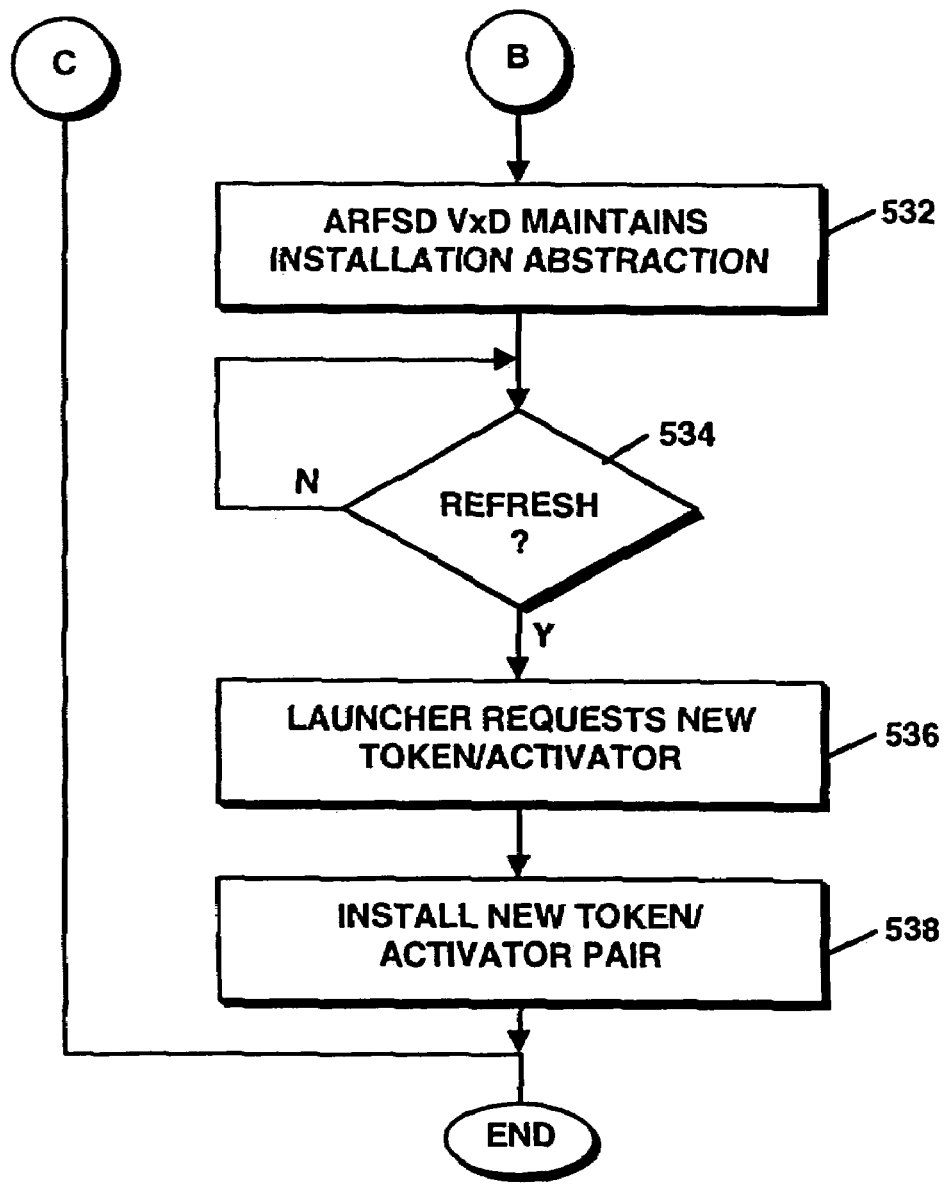

The flowchart of FIGS. 5A-C illustrates the procedural steps performed by the SCDP client 216 during a typical title execution in accordance with the present invention. As stated previously, when a launch string is received by the SCDP client's browser 224, the Multipurpose Internet Mail Extension (MIME) type associated with the launch string is located in a registry entry, which results in the invocation of the Launcher module 220 within the SCDP client 216. Upon invocation, Launcher 220 extracts the Universal Resource Name (URN) from the Launch String and requests the CAS 210 to perform a URN to URL conversion, as illustrated by step 6. The URN of the present invention is a unique identifier of a title within a briq. The standard URN format is as follows:

urn:arepa://vendor/path/titlename[#version]

In the URN, the path to the title need not correspond exactly to the current location of the title in the vendor's storage server. The path is a categorization convenience, and is not necessary. The title's version number is optional, and may be separated from the title name by a pound sign. The vendor name may be registered with a central authority in order to ensure uniqueness.

The Universal Resource Locator (URL) identifies the current location of a briq in a RAFT storage server. The standard URL format is as follows:

raft://hostname/path/briqname.brq

In a URL, the path must correspond exactly to the current location of the briq in the RAFT storage server.

FIGS. 5A-C collectively form a flow chart illustrating the process steps performed by the SCDP client and the modules contained therein during the subscription and title execution process in accordance with the present invention. Referring also to the elements of FIG. 2B, a user of the host computer on which the SCDP client runs utilizes a web browser 224 to select the desired title from virtual store front 215. The store front 215 returns a digital offer to the web browser, with the digital offer the user negotiates a purchase with the eCommerce server 202. The eCommerce server transmits an unsigned launch string back to the web browser over the network. The launch string is wrapped with a MIME header. When the launch string is received by the browser, the MIME type associated with the launch string is located in a file system registry entry resulting in the invocation of launcher module 220 of the SCDP client, as illustrated by step 502. Launcher module 220 extracts the URN value from the launch string and transmits the URN value to the CAS server 210, as illustrated in procedural step 504. Communications between the launcher 220 and the CAS 210 are established through a secure RPC connection. The CAS 210 provides a URN to URL conversion and transmits the corresponding URL to the SCDP client. Once the URL is received, as indicated by decisional step 506, the launcher 220 passes a request to read the URL header to ARFSD VxD 218, which, in turn, passes the request to the RAFT VxD 222. VxD 222 transmits the request using the RAFT protocol to RAFT server 206. The RAFT server 206 opens the URL and reads the header information. The header information is then passed back to the RAFT VxD 222, onto the ARFS VxD 218 and onto launcher 220. This whole process is represented by procedural step 508 of FIG. 5A. Next, launcher module 220 utilizes the header content to perform application testing requirements of the host system, as illustrated by procedural step 510.

Following completion of the system testing requirements, the launcher module 220 transmits a request for purchase authorization, via a secure RPC connection, to CAS 210, as illustrated in procedural step 512. In response to the request for purchase authorization, CAS 210 generates an activator, including a RAFT token, which is transmitted through the secure RPC connection to the SCDP client 216. Upon receipt of the activator, as indicated by decisional step 514, launcher module 220 installs the RAFT token and activator, as indicated by procedural step 516. The activator is installed in the ARFSD VxD 218, which, in turn, loads the RAFT token into the RAFT VxD, as illustrated by procedural steps 516 and 518, respectively. The RAFT VxD 222 then transmits the RAFT token to the RAFT server 206 using one of the appropriate commands from the RAFT protocol, as illustrated by procedural step 520. Next, the ARFSD VxD 218, through communications with VxD 222 reads the super block field from the briq located on RAFT server 206, as illustrated by procedural step 522, and verifies a magic number in the superblock, as illustrated by procedural step 524. The magic number in the briq may be implemented as a constant sequence of characters, for example "ARFS."

At that point, launcher module 220 begins to run the title executable file, as illustrated by procedural step 526. In the illustrative embodiment, the title executable is in the form of a Windows executable file located in the file system implemented by ARFSD VxD 218 using the data retrieved via RAFT VxD 222.

RAFT VxD 222 begins to retrieve the title directory and files from RAFT server 206, as illustrated by procedural step 528. The datablocks comprising the directories and files of a title are retrieved from RAFT server 206 using the RAFT protocol and the commands described herein. Specifically, the VxD 222 retrieves the data blocks from the RAFT server 206 in a read-ahead manner and caches the datablocks to facilitate efficient decryption and execution.

The ARFSD VxD 218 utilizes the activator, particularly the decryption key data, received from the CAS 210 to decrypt the data blocks retrieved from the RAFT server 206 and to perform integrity checking, as illustrated in procedural step 530. As described previously, the activator contains cryptographic information which is useful in decrypting the data contained within the briq prior to execution thereof. The ARFSD VxD 218 maintains an installation abstraction for the operating system creating the illusion that the file system necessary to execute the title is installed on the local host PC, as illustrated by procedural step 532. The process by which the VxD 218 maintains the installation abstractions described in greater detail with reference to FIG. 6.

The RAFT token received from the CAS 210 includes an end time field as described with reference to FIG. 8 and its accompanying description. Prior to expiration of the activator and RAFT token, the launcher module 220 issues a request via a secure RPC connection to CAS server 206 for a refreshed activator/RAFT token pair, as illustrated by decisional step 534 and process step 536. The new activator/RAFT token pair are installed and utilized in a manner similar to that previously described, as illustrated by process step 538.

Installation Abstraction

In accordance with the present invention, the title is never really "installed" on the SCDP client host system. The SCDP client software creates an installation abstraction, maintaining the illusion for the local operating system that the title currently executing is installed on the host computer. Thus, when execution of the title is terminated, there is no remaining evidence the title ran on the host client system. No files associated with the title are left on the host system hard-drive, and no operating system state information e.g., registry variables associated with the title, remain. The SCDP client system state after the title exits or the system crashes is the same as before, except, possibly, for operations performed by other applications, persistent state, and changes made by the user of the application e.g., saved documents or data. The installation abstraction is achieved with a method of loading the expected application state, before running the application, in such a way that the state can be unloaded when the application exits without affecting persistent parameters.

Each briq in accordance with the present invention, and as described with reference to FIG. 12, includes a file system for one or more specific titles. As described hereafter, a briq author utilizes a creator utility program to extract selected files from an application and the application installation directory. The briq author also extracts other information such as registry entries which may be necessary for the correct execution of the application. The creator program combines the selected files and other information and generates as an output a file system in the form of a briq, as well as a set of database entries. The briq is stored on the RAFT server. The database entries are stored on the CAS server and comprise such information as keying information and header check sum values.

Figure 6:
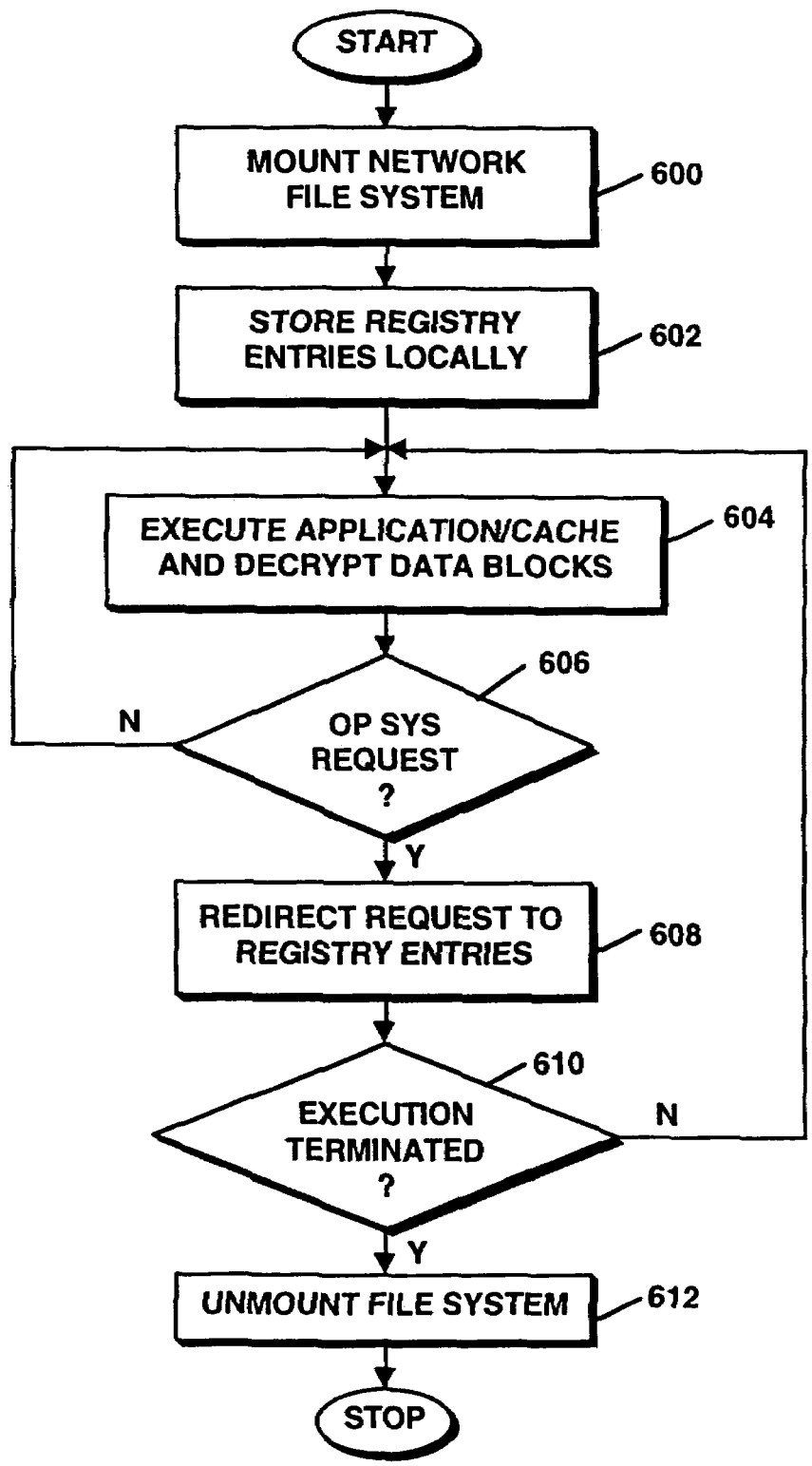
FIG. 6 is a flowchart illustrating the process executed by the SCDP client components in accordance with the present invention.

FIG. 6 is a flow chart illustrating the process steps performed by the SCDP client 216 and the modules 218-220 contained therein to maintain the installation abstraction during title execution in accordance with the present invention. Following selection and negotiation for the purchase of a particular title, the launcher 220 and ARFSD VxD 218 mount the file system, as indicated by step 600, and store the associated registry entries on the local drive of the host system, as indicated by step 602. A facility within the File Manager of Windows 95, Windows 98 and Windows NT operating systems, as well as equivalent functionality in the Unix operating system, allows the file directory and content of a remotely located file to be "mounted" or accessed over a computer network, thereby creating a "virtual drive" from which data can be accessed. In the present invention, mounting of the file system comprises using the previously described technique to access the RAFT server through the SCDP client operating system interface. Mounting of the file system may result in caching all or a portion of the data blocks from a briq which contain the title content as well as the registry entries associated with the title. The series of registry entries are stored locally on the SCDP client's host system memory and may include such information as the directory where the title files have been installed, etc. ARFSD VxD 218 further extracts the appropriate database entries from the CAS database 212.

Using the keying information from the activator, which has been forwarded to the SCDP client by the CAS server, the data blocks from the briq are decrypted and executed as an operating system file system, as indicated by step 604. Data blocks from the briq are cached locally on the SCDP client on an as-needed basis throughout title execution. During execution of the program, operating system device drivers, such as those contained within the virtual memory manager portion of the operating system make requests for registry entries stored on the local physical drive. Upon execution of the application, the ARFSD VxD 218 starts intercepting such operating requests, as indicated by decisional block 606. The calls, where applicable, are satisfied with entries from the list of registry entries stored locally, as indicated by step 608. Some information, however, is written directly to the operating system using the write-through techniques described hereafter.

Interception of operating system calls, and satisfaction of these requests using the locally stored registry entries, continues until termination of application execution, as indicated by decisional step 610. At that point, the launcher directs the ARFSD VxD 218 to unmount or disconnect the file system, as indicated by step 612. As a result operating system requests are no longer redirected to the locally stored registry entries. Both the locally stored registry entries and any data blocks which have been cached locally may be either erased or over written. As a result, the state of the SCDP client prior to execution of the title or application is returned to its status quo without any remnants of installation of the title, except any limited write-through data which the user intentionally wishes to retain.

Write-Through Local Storage

During the generation of a briq by the author utilizing the creator program, files and directories can be tagged with a "write-through" attribute. Briqs containing write-through files or directories may contain a container with the tag, LOCL. This container contains the full path of all write-through directories and the path of any directory, other than the root directory, which contains write-through files, specified with the tag LDIR. The user is allowed to specify that the pathname of the root directory for locally stored files. The new pathname contains the Vendor field from the URN in order to ensure uniqueness. This information is stored in the ROOT tag in the title's LOCL container. By default, ARFSD VxD reports 0 bytes free on the local drive. Briqs containing no write-through files or directories will always report 0 bytes free. The presence of the a tag in a title's LOCL container specifies that ARFSD VxD should report the amount of free space on the drive containing the local storage directory. Titles need a LOCL container only if they need to specify non-default values for the ROOT.

When a briq containing write-through files or directories, i.e. containing a LOCL container in the header, is loaded, the launcher within the SCDP client creates a directory for local storage under the SCDP install directory. This directory is derived from the URN unless a directory is specified by the ROOT tag in the title's LOCL container. The launcher creates a sub-directory in the local storage directory for each directory specified with the LDIR tag in the header. The root pathname of the local storage path is passed as well as whether to report free disk space to ARFSD VxD when loading the briq. All files in local storage areas are deleted when the Launcher software is uninstalled, and, optionally, upon title exit. These locally stored files are persistent by default. Launcher must create directories in local storage for all write-through directories in a briq.

When a write-through file is started, the information is taken from the file in the local storage area having the same naming convention as directories mentioned above. If the file doesn't exist in local storage, it is first copied there from the briq. The original file in the briq may not be compressed or encrypted, aside from whole-briq encryption. When a write-through file is opened, the copy on local disk is opened, and all requests on the ARFSD VxD file handle are performed on the real file handle.

Conditional Access Server (CAS)

Figure 7A:
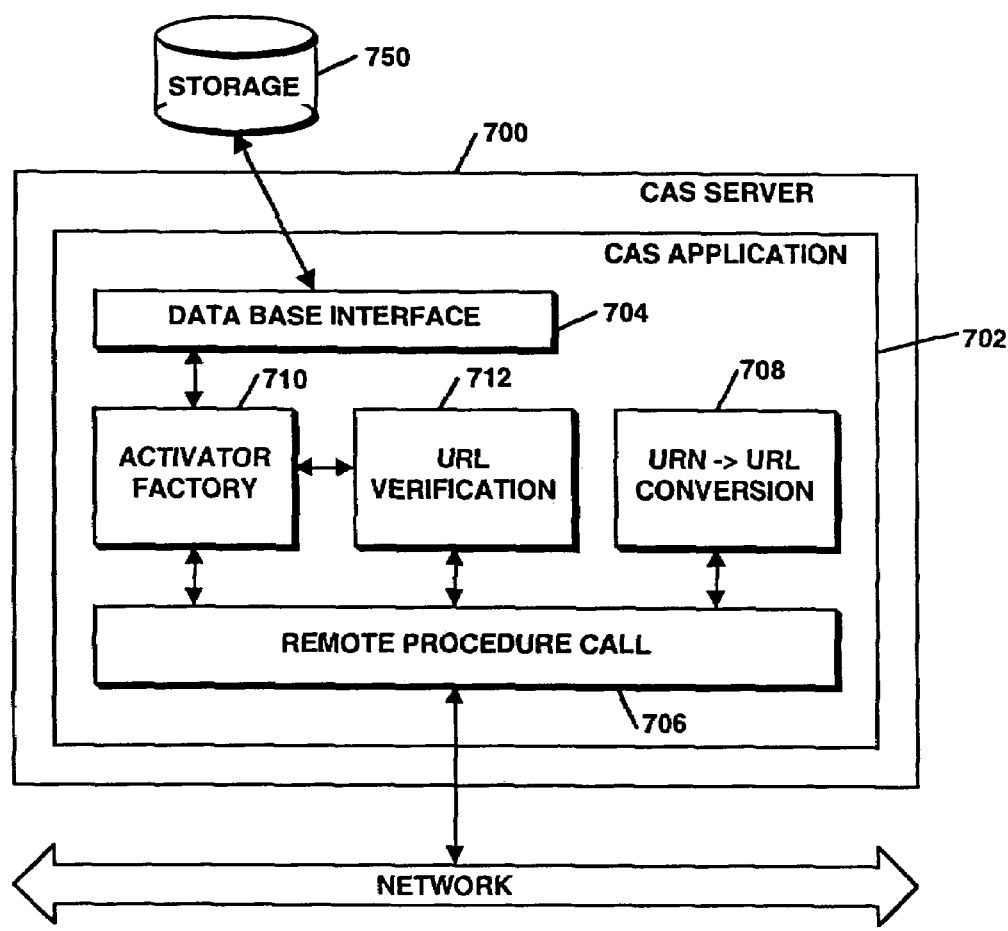
FIG. 7A is a conceptual diagram of CAS server of FIG. 2 in accordance with the present invention.

FIG. 7A is a conceptual block diagram of the Conditional Access Server (CAS) 700 and associated database 750. In the illustrative embodiment, the CAS may be implemented as an application executable on a POSIX.1 (IEEE Std 1003.1, 1998) compatible platform, such as the Sun Solaris® operating system commercially available from Sun Microsystems, Palo Alto, Calif., or the Linux operating system commercially available from Red Hat Software, such platforms may execute on a computer architecture similar to that illustrated in FIG. 1. The CAS application 702 further comprises a database interface module 704, a remote procedure call interface 706, a URN to URL conversion module 708, an activator factory 710, and a URL verification module 712.

The database interface module 704 interfaces with the CAS database 750 and may be implemented using commercial database products. Database 750 may be used to store short-term stay data, such as the stay data of a token requesting refresh, or long-term stay data, such as title names, cryptographic key information, and other information for titles available over the SCDP system. Database 750 may be shared by multiple CAS servers 700, if more than one CAS server is present in an implementation over a network. Database interface 704 and database 750 communicate the SQL standard database query language. The SQL standard is published by the American National Standards Institute (ANSI). Database interface 704 comprises a set of objects that filter queries received by the server 700. Such filters are useful in focusing or customizing the scope of a database query.

CAS server 700 is coupled to the rest SCDP system via network 205, which in the illustrative embodiment is an Internet protocol based network implemented in either the form of a local area network or a global network. Server 700 interfaces with network 205 through a remote procedure called module 706. Module 706 may comprise code or objects which adhere to the open network computing remote procedure call standard, published by Sun Microsystems (RFC 1057 issued by the Internet Engineering task force). Such RPC standard defines code which controls the flow and function calls between two entities trying to communicate remotely over a network. Module 706 may be implemented with any number of commercial tools available which make remote procedure calls appear similar to subroutine function calls. Once such product useful for implementation of module 706 is the Noblenet Secure RPC from Noblenet, Inc., Southborough, Mass. The Noblenet Secure RPC provides a standard RPC interface with an additional security layer.

URN to URL conversion module 708 comprises code or series of objects which, if given a URN query database 750 and return a corresponding URL. Such URNs are received from the launcher module of the SCDP client over network 205. Database 750 where the URLs are stored may be implemented as a sequential database having a plurality of records. Module 708 forwards the appropriate query to the database interface 704 and receives the appropriate URL from the database. Module 708 then transmits through RPC module 706, the corresponding URL to the SCDP client over the Network. Alternatively, in an environment where a limited number of titles and/or content servers are utilized, the URLs may be stored on a disc associated with the server and module 708 may comprise program logic to carry out a look-up table conversion of a received URN.

The conversion module 708 converts the abstract URN data structures to specific URL data structures and may be implemented with a series of conversion tables and associated comparison logic. The URL verification module 712 comprises code or equivalent objects which receives a launch string from the eCommerce server 202, as explained in greater detail hereinafter, time stamps the launch string and digitally signs the launch string through use of a hash code and encryption key. Specifically, a message authentication code may be appended to the launch string as received by the CAS 700. The message authentication code may include a hash code generated in accordance with the MD5 hash algorithm and further includes an encryption key which may be generated in accordance with any number of encryption standards including the Data Encryption Standard (DES). The digitally signed launch string is then forwarded to the eCommerce server 202 for transmission back to the client host systems web browser as described herein.

In the SCDP system, the activator serves as a mechanism to deliver keying information to potentially unsecure client processes. The activator generation module 710 of server 700 comprises code or appropriate objects which generate a series of byte codes and appends a crytographic key to the series of byte codes, the key being retrieved, in one implementation from database 750. The implementation of the activator generation module depends in part on the sophistication of the activators utilized within the SCDP system. For an activator comprising a series of byte codes and a key appended thereto or integrated therein, the activator generation module 710 has the implementation described above. In alternative embodiments, where the key is integrated into the activator in a more secure manner, e.g., folding the key into the byte code sequence, additional logic and/or objects would be required to implement such functions within module 710. For example, rather than appending a key to a series of byte codes, a sequence of byte codes which perform a function, such as generation of a number or performing other logic operations may be inserted into the activator. In such an embodiment, the module 710 may include logic to randomly select from one of a number of byte code sequence or techniques described herein as code obfuscation techniques. With such an embodiment, the module 710 is capable of randomly generating activators with a higher degree of security. Alternatively, with more sophisticated activator implementations, activator module 710 may generate an activator through calling an activator generation routine which may be resident in an external library.

The above-described CAS modules may perform five primary functions within the SCDP system. First, the CAS provides users with the cryptographic activators that allow one-time use of encrypted briq content. Second, the CAS insures that the SCDP system can accurately track the usage of titles and to support a security model in which development of a "hacked" client designed to steal usage is very difficult. Third, the CAS provides limited-lifetime RAFT authorization tokens signed with a CAS private key and bundled with an activator. The RAFT client includes the authorization token with it's RAFT requests. The RAFT server uses the token to verify a client's right to access the requested content. Fourth, the CAS interacts with the eCommerce software billing system to "settle" transactions. The transaction settlement is not done during purchase negotiation but is delayed until the CAS is assured that the end user has been able to run the content successfully. Completion of the first activator refresh is an indication that the title is running successfully. Fifth, the CAS maintains a database for title usage reporting and activator tracking.

Three types of logs may be associated with the CAS. First, CAS activity is be logged to a standard UNIX text log. This log is intended only for diagnostic purposes. Second, the CAS records transactions into the CAS database table, for reporting purposes and for activator tracking. These records are in addition to those kept by the e-commerce system, which are used for actual billing purposes. Third, the CAS database itself keeps internal transaction logs, which are the mechanisms used to insure that database transactions are completed or rolled back successfully. Such functionality may be internal to the CAS database. In the illustrative embodiment, the CAS will use a commercially available database maintenance software such as that commercially available from Oracle Software to insure that a purchase is committed or rolled back. Database transactions are different than financial transactions described above. A financial transaction may be a database transaction, but many other transactions such as updating a user name, may be database transactions.

In the illustrative embodiment, the CAS supports an administration interface with which an system administator can monitor CAS status, for example, the current number of database connection threads in use and the current number of user connections, i.e., connection threads in use. In addition, statistical information such as the peak number of user and database connections used since startup; the number of times since startup that user or database connections have reached a predetermined limit may be made available.

The SCDP client interacts with the CAS by means of a client library. The client library may be specific to each client platform, because it uses platform-native methods to communicate with the SCDP client GUI. In the illustrative embodiment, i.e., the Win32 platform, the client library is called CASLIB32. The client library exports the CAS interface classes CCAS, which represents the transport to the CAS, and CCasSession, which represents a specific client session. An Application Program Interface (API) allows the CASLIB32 client to negotiate for multiple titles simultaneously by using multiple sessions. The API also exports extra classes that represent information passed to and received from the CAS that insulate the CAS interface from the specifics of the transport protocol. Such methods may be implemented as, CActivator, CUrl, etc. The CCAS responds asynchronously to the client by sending Windows messages.

CAS Support for Activators

The simplest implementation of an activator is a bytecode routine that has the key for a given briq compiled into the activator. With this activator implementation, the CAS authenticates the client, identifies the purchased briq, constructs the activator bytecode and downloads the activator. The SCDP client can then close the connection and run the title. Such activators may be generated in advance and retrieved directly from a database by the CAS activator factory 710 and interface 704.

In a more sophisticated activator implementation, the activator is aware of a cryptographic algorithm, and requests a key from the CAS. The CAS has authentication information and security data from the existing stream, and can have a predefined RPC response for "request key" with whatever arguments are needed.

In another implementation, the activator may have arbitrary code for some new mechanism, possibly requiring multiple stages. The activator can make a Remote Procedure Call to the CAS with opaque arguments and a specification of a "technique," as explained hereafter. The CAS then dispatches the opaque data to the Technique, which returns opaque data to the client or makes other calls, or calls out to other services. If the CAS has its own interpreter, the CAS can retrieve the code for the Activator and the technique from the database. If all Activators are pre-generated, there may be many possible activators for any single technique. Alternatively a database of obfuscations and a set of rules for how to combine them may be maintained by the CAS.

The CAS selects an activator appropriate to a given client, product, and purchase. The CAS delivers the activator, and "supports" the activator through additional RPCs. Many CAS RPCs can be predefined, such as a simple "request key" for a given briq. Such RPCs may be restricted based on the particular activator selected. For example, most clients won't be permitted the simple "request key" call, but would be required to perform whatever calls the Technique expects the activator to use.

Figure 7B:
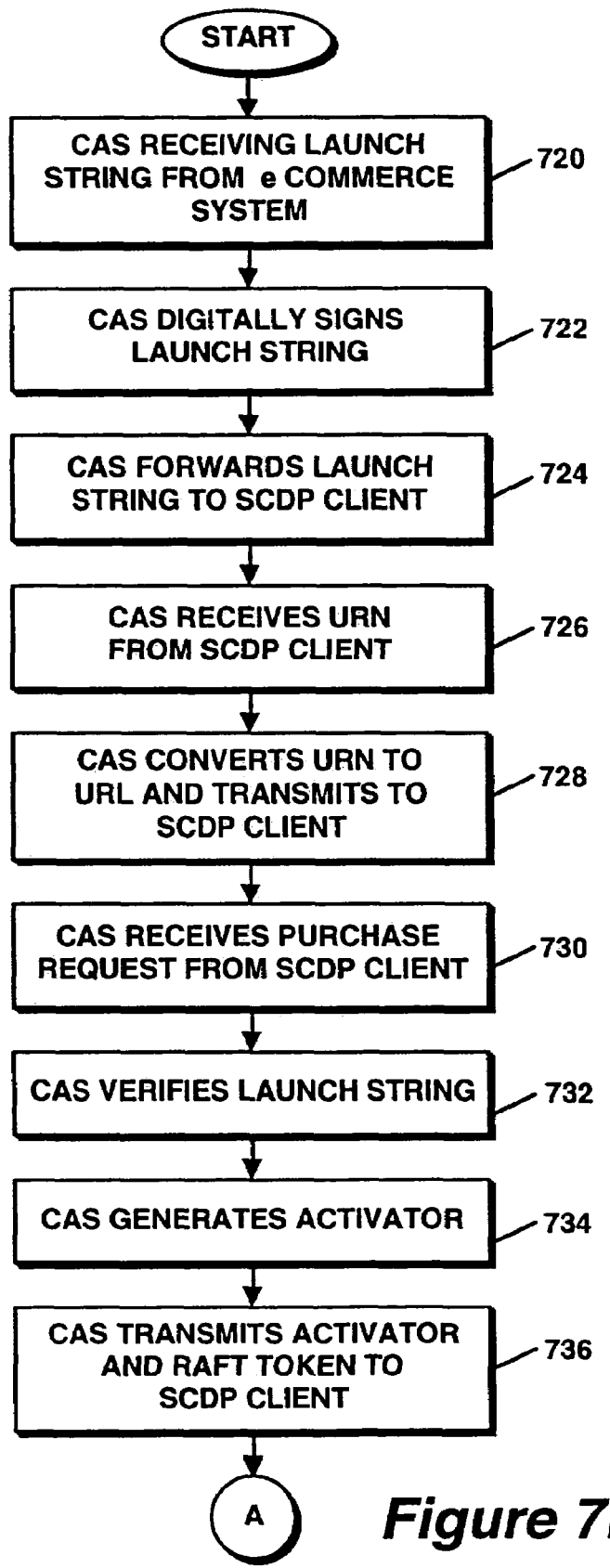
FIGS. 7B-7C are flowcharts illustrating the process executed by the CAS server in accordance with the present invention.
Figure 7C:
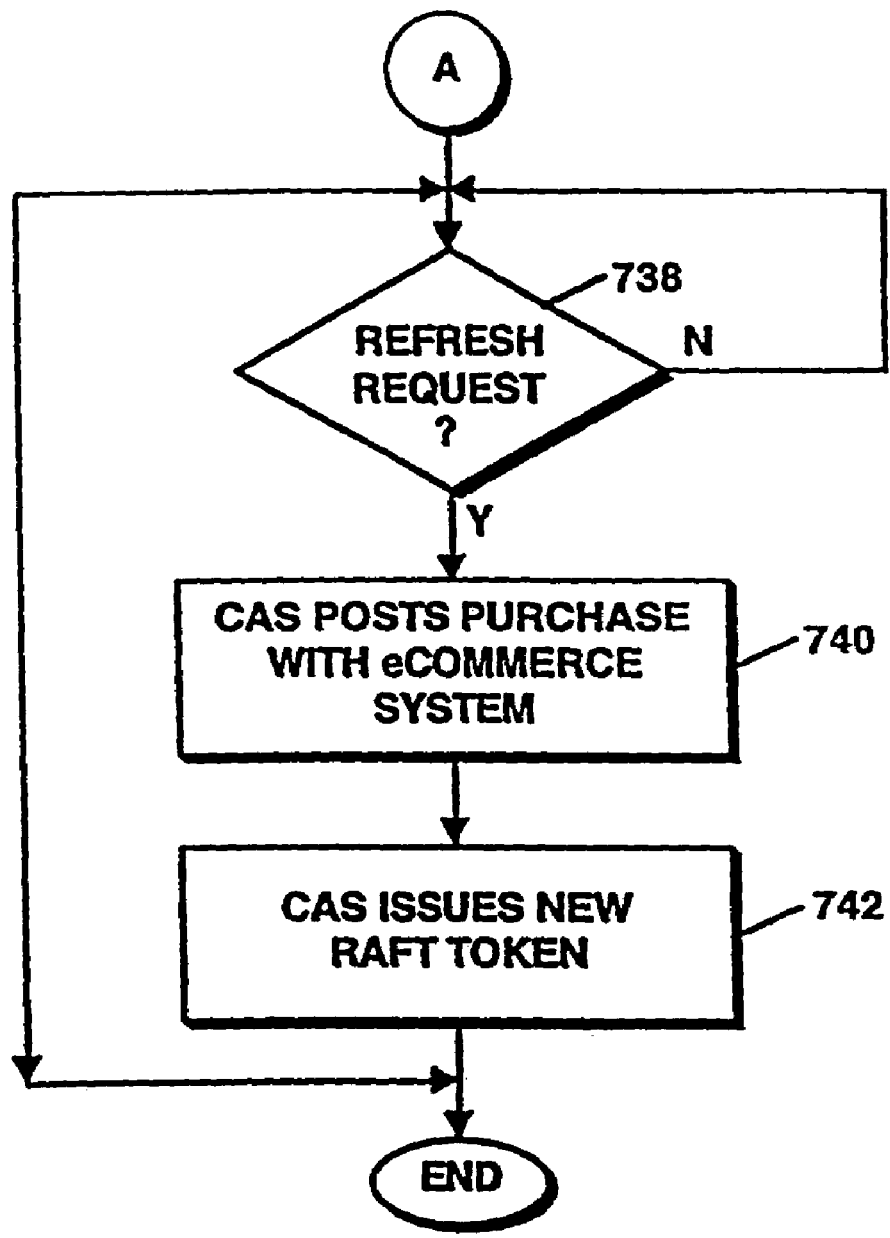

Referring to FIGS. 7B-7C, a flowchart illustrating the process steps performed by the CAS 700 during the subscription and title execution process is illustrated. Specifically, CAS 700 receives a launch string, as described with referenced to FIG. 9 and its accompanying explanation, from the eCommerce server, as illustrated in step 720. Next, the CAS digitally "signs" the launch string, as indicated in procedural step 722. The CAS "signs" the launch string with a private cryptographic key. The signed launch string is then forwarded from CAS 700 to the SCDP client executing on a host system connected to the broadband network, as illustrated by process step 724. The SCDP client extracts URN from the launch string, as described herein with reference to FIGS. 5A-C and their accompanying descriptions, and transmits the URN to CAS 700. CAS 700 receives the URN from the SCDP client, as illustrated by step 726, and performs a conversion of the URN to a URL, as illustrated by procedural step 728. As described previously, the CAS 700 performs the URN to URL conversion using module 708 as described previously. Such conversion may include a query of database 750 or use of a table look-up algorithm, depending on the implementation of module 708. The CAS 700 transmits the URL list to the SCDP client, also illustrated by procedural step 728. Next, CAS 700 receives a purchase authorization request from the SCDP client, as illustrated by procedural step 730. The purchase authorization request from the SCDP client includes the launch string. CAS 700 then verifies the launch string to determine if the launch string had been previously signed by it, or, in an implementation with multiple conditional access servers, by another authorized CAS server, as illustrated by procedural step 732. CAS 700 then generates an activator for the client requesting purchase authorization, as illustrated by process step 734. Activator generation occurs in accordance with the specific implementation of module 710 of the CAS server, as described herein.

Next, CAS 700 transmits the activator as well as a RAFT token to the SCDP client, as illustrated in procedural step 736. The CAS 700 retrieves the RAFT token from database 750. The RAFT token has the format illustrated in FIG. 8 and as described in the relevant portions herein. The activator and RAFT token enable the SCDP client to access the desired title and to begin execution of the title data as described herein. At this point, the CAS will take no further action regarding the specific SCDP client until an activator token refresh request is received from the SCDP client, as illustrated by decisional step 738. Upon receipt of the first refresh request from the SCDP client, the CAS 700 posts the title purchase to the eCommerce server, as illustrated by procedural step 740. Posting of the transaction with the eCommerce server comprises the actual recorded acknowledgement that the user has paid for the identified title. Such posting is delayed until the first refresh request to ensure that the title is executing properly on the SCDP client. The time-out mechanism within the activator initially sent from the CAS to the SCDP client expires after a predetermined interval, indicating that the title is executing appropriately. The CAS issues a new token, as illustrated in procedural step 742, and transmits the pair to the requesting SCDP activator client. The RAFT token life time, as indicated by the start time and stop time fields of the RAFT token, may be longer than the lifetime of the token initially transmitted to the SCDP client with the activator. Subsequent requests for activator/token refresh from the SCDP client will not cause the CAS to post the purchase of the title to the eCommerce server. As described previously, all communication between the SCDP client and the CAS occur over a secure RPC connection, such connection may be established using a commercial product which adheres to the RPC standard.

As may be appreciated by those skilled in the art, the process outlined in FIG. 7D highlights those steps executed by the CAS in relationship to a particular SCDP client which will terminate when title execution ends. It will be obvious to those reasonably skilled in the art that the CAS may be implemented as a multi-tasking application in which several separate threads are currently executing various steps of the illustrated process. Accordingly, while servicing the requests of a specific SCDP client, the CAS may be concurrently servicing the requests from other SCDP clients as well.

RPC Transport

The CAS and CASLIB32 communicate through a standards-based Remote Procedure Call library, such as the NobleNet Secure RPC. The SCDP client makes synchronous calls to the CAS, which assigns them to a thread for processing. CASLIB32 presents an asynchronous interface to its attached GUI, so internally it queues the synchronous RPC requests and places them from a background thread. To provide high transaction throughput, the CAS maintains a pool of ready threads that can be used to run tasks. The thread pool is a reusable C++ class. Incoming tasks are intercepted in the RPC layer, queued to the thread pool, and eventually processed on a thread as opposed to being processed inline. The thread pool allows the CAS to process higher simultaneous transaction rates and perform better under short load spikes. The RPC calls need to allocate thread-safe memory that can be tagged and freed later, because buffers cannot be freed until the RPC transport is done sending them. The CAS uses a reusable C++ memory pool class that can delete memory by thread id.

The CAS may be implemented as a stateless server, like a web server. A stateless server has the advantage that it can be easily scaled by deploying more server machines and using "round robin" software to parcel out incoming connections to the servers, since an SCDP client's subsequent requests do not need to go to the server it originally connected to. The CAS maintains a connected socket TCP stream between requests, so some information could be attached, such as a transport session key. If this connection is dropped, the CASLIB32 will attempt to reconnect, potentially to a different CAS process, so pushing state out to CASLIB32 or into the database is preferable.

To facilitate high transaction volume, the CAS is designed to make use of a pool of multiple active database connections. Server threads request connections from the pool, which reconnects dead connections in the background as necessary to minimize database connection latency. The database connection pool is implemented as a reusable C++ class. The CAS uses an abstract database interface called DBObject, which is implemented as a reusable C++ class and allows the CAS to be ported easily to other databases.

Raft Token

To improve the overall security model of the SCDP system, the CAS provides the SDCP client with a signed RAFT Authorization Token. The RAFT token authorizes a particular SCDP client to access a particular URN, for a specified time period. The CAS digitally signs the RAFT Token, using standardized, public-key digital signature algorithms. In order to access a executable content on a RAFT server, the RAFT VxD must present its token to that server. The RAFT server verifies the CAS's digital signature and then verifies the token's contents. The RAFT token 800 is valid for any number of the RAFT servers within a CAS's administrative domain; i.e., a broadband service provider may install multiple RAFT servers on their network, and the RAFT token would be admissible by any of them.

In the illustrative embodiment, the RAFT token is implemented as a data structure having the format illustrated in FIG. 8. The RAFT token 800 comprises an URN, an URN length 804, a start time 806, an end time 808, an IP address 810, and a CAS signature 812. The URN 802 and its associated length 804, define the specific title that the RAFT token will unlock. The start time 806 and end time 808 define the lifetime of the token. The format of the described URN has been described previously. The RAFT authorization token contains the RAFT client's IP address as a 32-bit value in network byte order, the requested URN, and 32-bit start and expiration times. The times are defined as POSIX 1003.1-1988 "seconds since the Epoch" or approximately seconds since 00:00:00 GMT, Jan. 1, 1970. The CAS signs the token with the CAS group's private key so that the RAFT server can validate its authenticity. The RAFT server will deny access if server's current time is not within the token's window. The IP address defines the network address of the SCDP client requesting the activator/token. The RAFT server will deny access if the SCDP client providing the token does not have the same IP address, thereby preventing another client from using a stolen token.

The RAFT token is transferred to the client as part of the activator. RAFT tokens are refreshed along with activators. The activator is constructed with a time-to-live mechanism. The SCDP client issues a CAS request, via the RPC mechanism, to refresh the activator/token combination prior to expiration of the existing activator.

Random Access File Transport Protocol and Server

Figure 10:
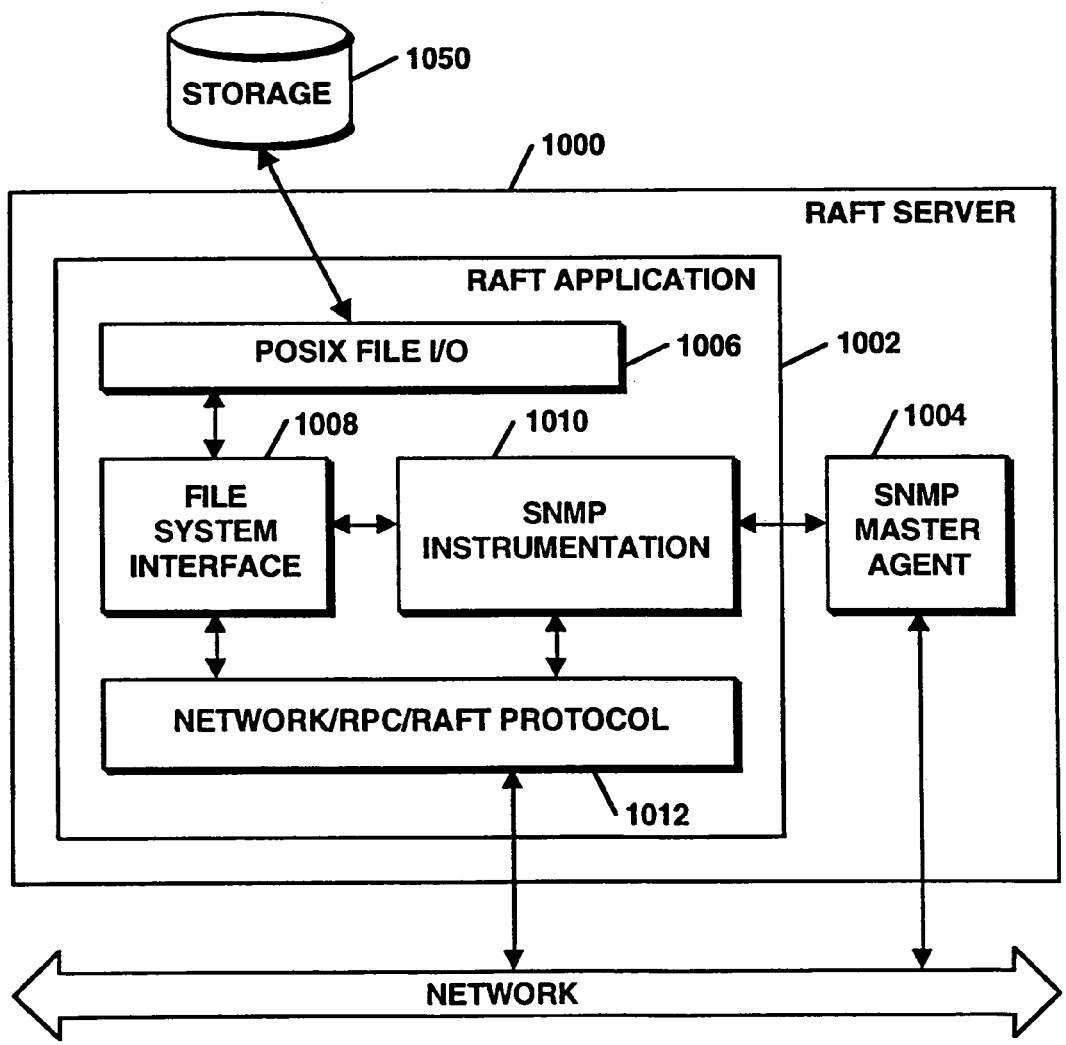
FIG. 10 is a conceptual diagram of the RAFT server of FIG. 2 in accordance with the present invention.

FIG. 10 illustrates conceptually a block diagram of the RAFT Server 1000 and its accompanying database 1050. In the illustrative embodiment, the RAFT Server 1000 may be implemented as an application executable on a POSIX.1 (IEEE Std 1003.1, 1998) compatible platform, such as the Sun Solaris® operating system commercially available from Sun Microsystems, Palo Alto, Calif., or the Linux operating system commercially available from Red Hat Software, such platforms may execute on a computer architecture similar to that illustrated in FIG. 1.

The RAFT server may be implemented as a RAFT application 1002 and a Simple Network Management Protocol (SNMP) master agent 1004 executing on top of the operating system. A commercial product suitable for implementing the SNMP master agent 1004 is the Emanate product commercially available from SNMP Research, Inc. The master agent 1004 communicates with network 205 using published application program interfaces in accordance with the SNMP standards.

The RAFT application 1002 comprises a POSIX (Portable Operating System Interface Standard) file input/output module 1006, a file system interface 1008, and SNMP instrumentation module 1010 (i.e., the RAFT SNMP sub-agent) and a network/RPC/RAFT protocol interface module 1012.

The SNMP instrumentation module 1010 contains objects or corresponding code which collects statistical and logistical information useful for a system administrator in throttling the bandwidth of the network to improve network performance. As such, module 1010 is an optional element of Raft Server 1000.

The RPC Raft Protocol module 1012 interfaces with the IP based network 205 using a proprietary RPC protocol as defined herein. Module 1012 includes the necessary code and/or objects to implement the protocol and to verify the contents of the RAFT token.

The file input output module 1006 may be an object-oriented implementation according to POSIX standard 1003.1 published by the Institute of Electrical and Electronic Engineers (IEEE). The POSIX I/O module 1006 provides a local file system interface abstraction for memory discs 1050. Memory 1050, illustrated conceptually in FIG. 10 are used to store multiple titles in the forms of briqs. In the contemplated embodiment, the header portion of a briq which is unencoded and the body portion of a briq, which is encoded, are stored together. However, they are accessed independently from each other utilizing module 1006 and 1008. File system interface module 1008 contains program logic which receives requests for a particular briq and maps the briq into the directory and file where it is stored in memory 1050. In this manner, file system interface 1008 functions as an interface between the network request from the SCDP system and the memory 1050. In the illustrative embodiment, memory 1050 may be implemented as one or more discs, e.g., a RAID disc array or a disc farm. The file system interface module 1008 interfaces with the file input/output module 1006 and the network protocol module 1012 and implements program logic for accessing files and briqs as described herein.

The SNMP master agent 1004 provides SNMP protocol services on behalf of the RAFT SNMP subagent, which is embedded within the RAFT application. The RAFT application uses its SNMP subagent to make its management accessible to a remote SNMP manager.

The following steps describe the interaction between the SCDP client and the RAFT server, the Launcher launches a title. Launcher contacts the CAS server to obtain a list of URLs that correspond to the requested URN. A URL identifies the location of a particular briq, including the RAFT server on which it resides. For each RAFT URL, a weight may be returned to help select the most appropriate URL. A URL is more desirable when it has a higher weight value.

Following the URN- to URL conversion by the CAS, the SCDP client sends the CAS a purchase request described previously in the discussion of the CAS exchanges. In response to the purchase request, the CAS server provides the SCDP client with an activator containing the RAFT Authorization Token for the selected URN. Note that the Authorization Token is valid for any of the URLs associated with the selected URN.

Launcher then examines the list of URLs to determine if any RAFT URLs are present. If RAFT URLs are present, the Launcher sends only the list of RAFT URLs along with the RAFT access token to ARFSD VxD which will forward this information to the RAFT client, i.e. the RAFT VxD of the SCDP client. The Launcher also provides a weight for each of the RAFT URLs. These weights may be different than the ones provided by the CAS during the URN to URL conversion. The RAFT client then establishes a connection with one of the RAFT servers specified by the list of URLs. The RAFT client may contain the appropriate program logic which enables it to use the weights provided with the URLs to decide which RAFT server to contact first.

The RAFT client then attempts to open a Briq on the RAFT server 1000. The client specifies a protocol version, the path name (from the URL) and the RAFT access token. The protocol version is a 32-bit value used to verify that the RAFT client and RART server are protocol compatible. To validate access, the RAFT server verifies that the URN provided in the token is one of the ones listed in the Briq header. The RAFT server 1000 checks the RAFT token's start and expiration times during the open. If the RAFT_OPEN is successful, the RAFT server returns a RAFT file handle and a unique ID for the Briq, e.g. a hash of the Briq tag, used for caching.

In order for the RAFT server to validate the expiration time, the RAFT server time is synchronized with the CAS to within a predetermined interval. The RAFT server therefore accepts start times earlier than the current time and does not deny access until after expiration of the interval. The token expiration time is proposed to be some multiple of the Activator keep-alive time plus additional time to handle varying network and server latencies.

On each subsequent RAFT read request, the RAFT server checks that the access token has not expired. The RAFT server will fail any request that occurs when the server does not have a valid access token for that particular client.

Eventually, the RAFT access token will expire. The SCDP client's activator keep-alive mechanism is responsible for obtaining a new RAFT token before the current token expires. This insures RAFT tokens are refreshed in timely manner so that access failures will not occur under normal operating conditions. When the RAFT client sends the token to the RAFT server during a RAFT_OPEN, RAFT client must compute how long the token is valid from the start and expiration time. Since the RAFT client cannot verify the legitimacy of the token contents without the CAS' public key, RAFT client must wait for a successful RAFT_OPEN to determine that the token is valid before setting its refresh time. However, the refresh time is based upon when RAFT client received the token and not when the RAFT_OPEN completed. To insure uninterrupted access to the server, the RAFT client requests a new RAFT access token from the CAS in advance of when the token expires. Upon receipt of the new RAFT access token, the RAFT client will send a RAFT_REFRESH operation with the newly obtained token to the RAFT server.

When the RAFT client is finished accessing a Briq, the RAFT client sends a RAFT_CLOSE message with the RAFT file handle. If the RAFT server loses the connection to the RAFT client, all open files corresponding to that connection are automatically closed.

Raft Packet Header Definition

All communications in accordance with the RAFT protocol contain a RAFT packet header 1100, as illustrated in FIG. 11. The RAFT packet header 1100 may be implemented as a data structure comprising a procedure number data field 1102, a sequence number data field 1104, a packet length data field 1106, and a status data field 1108. The procedure number field 1102 indicates the RAFT protocol message type and may be implemented in the form of an integer. The sequence number field 1104 is used to match requests with responses and may be implemented in the form of an integer. The sequence number is only unique per connection. The packet length field 1106 indicates the size of the packet data, not including the size of the header, and may be implemented in the form of an integer. The status field 1108 indicates the status from the RAFT request and may be implemented in the form of an integer. A non-zero status indicates that the request failed. Different protocol messages will return different status codes. However, a status of zero indicates that the request completed successfully. A non-zero status results in the length field being set to zero, indicating that no packet data will be returned if a request fails. In accordance with the RAFT protocol the packet header is followed by the RAFT packet data.

RAFT Protocol Messages

The RAFT protocol consists of four distinct protocol messages which enable briq access and RAFT token management. After establishing the TCP connection, the initial RAFT protocol message contains the protocol version as one of its arguments in order to identify the protocol version of the requester. A list and description of the RAFT protocol messages as follows. The RAFT_OPEN function is called with a protocol version, a token length, a RAFT access token, a path length, and a null-terminated full path name. Upon success, the result is a RAFT file handle, a RAFT ID, and the maximum read length supported by the RAFT server. The RAFT ID may be used to generate an SCDP client cache tag. The RAFT ID may be the Briq ID to enable consistent caching across multiple RAFT servers in case fail-over occurs. The maximum read length is intended to inform the RAFT client about how much data it can request during a RAFT_READ operation.

The RAFT_REFRESH_TOKEN function enables the RAFT client to update the RAFT server with a newer RAFT access token and is called with a token length, a RAFT access token and a RAFT file handle. Upon success, the new RAFT access token replaces the current token associated with the specified handle, effectively increasing the expiration time of the token. The current token will be retained if the new token is invalid. This function does not return any data, but the status in the header is updated to reflect success or failure.

RAFT_READ function is called with the RAFT file handle returned from the RAFT_OPEN call, a 64-bit offset, and a length. The RAFT file handle must be associated with a valid access token in order to access the requested data.

The RAFT_CLOSE function is used to close an open RAFT file handle. The call takes a RAFT file handle and does not return any data. However, the status in the header is updated to indicate success or failure.

Launch String

FIG. 9 illustrates a launch string 900 in accordance with the present invention. The Launch String 900 may be implemented as a data structure comprising a URN data field 902, a Store ID data field 904, a goods type data field 906, a subscription domain data field 908 and an amount data field 910, as illustrated in FIG. 9. The URN 902 uniquely identifying the desired content and may be implemented, as described herein. The Store ID 904 identifies a specific storefront to the eCommerce system and may be implemented in the form of a numeric or alphanumeric character string or an integer. Store IDs are used to separate the transactions from different storefronts for reporting purchase. Multiple storefronts may share a store ID if they are really representing the same organization. The goods type 906 indicates whether the transaction should be a purchase through a subscription or through a microtransaction and may be implemented in the form of a numeric or alphanumeric character string or an integer. A subscription transaction is a single payment for unlimited use of a title or set of titles over a specified period of time. A microtransaction is a charge against a user debit account, and is used to support the "pay-per-single-use" payment model. The subscription domain 908 indicates if the transaction is covered by a specific subscription offer for example, "Weekly Hot Game Pack" or "Small Office Applications Package," applicable to the purchase. The subscription domain may be implemented in the form of a numeric or alphanumeric character string or an integer. The amount field 910 indicates the purchase amount of the microtransaction and may be implemented in the form of an integer.

Figure 14:
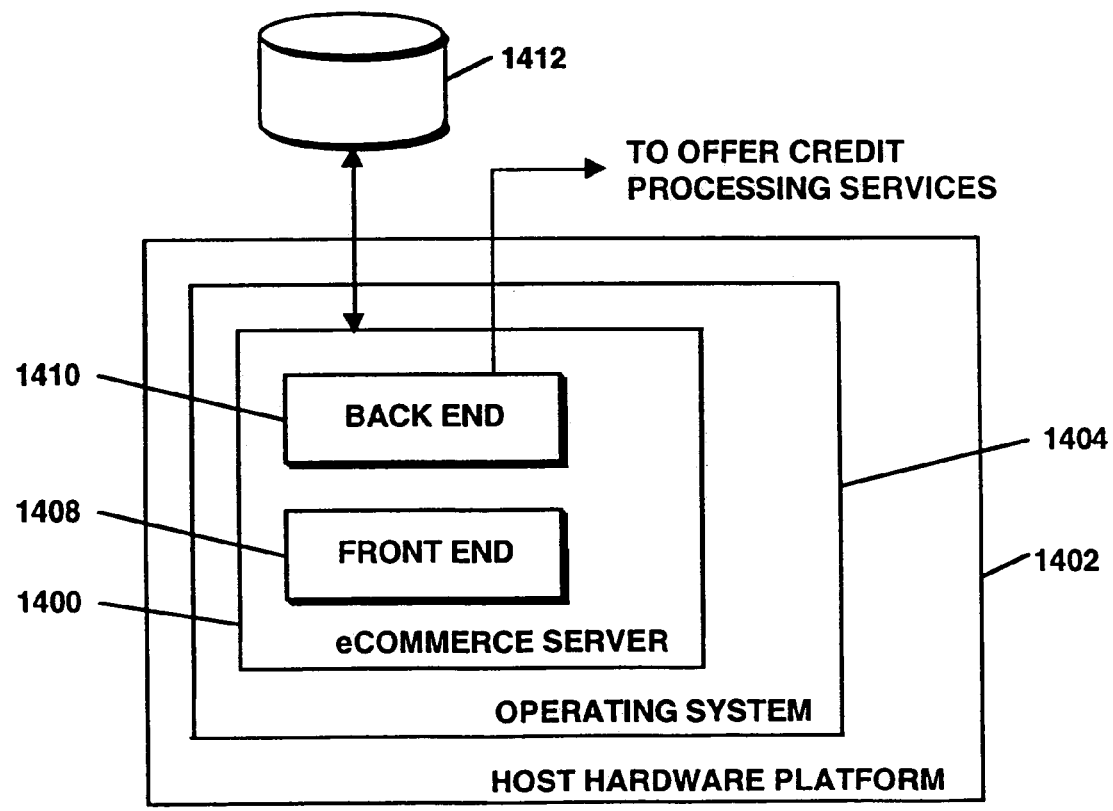
FIG. 14 is a conceptual block diagram of an eCommerce service in accordance with the present invention.

The contents of launch string 900 are generated by the eCommerce server front end module 1408 as illustrated in FIG. 14. The CAS digitally signs the launch string 900, using, for example, a standardized, public-key digital signature algorithm. Thereafter, launch string 900 comprises an additional CAS signature field 912 which identifies the CAS group's private key. The Launch String is sent to the SDCP client via the eCommerce system, as part of the fulfillment process. The SDCP client passes the Launch String back to the CAS during its pre-launch negotiations with the CAS, as explained herein.

eCommerce System

An electronic commerce software application, hereafter referred to as eCommerce system, suitable for use with the present invention is Transact 4.0, commercially available from OpenMarket, Cambridge, Mass. eCommerce software is used for managing user accounts and conducting financial transactions, including to 1) maintain user account information, 2) manage purchase and payment, 3) collect and verify credit card information, and 4) settle transactions.

Referring again to FIG. 2, eCommerce server 202 comprises a server application running on a computer architecture similar to that described with reference to FIG. 1. The application may be designed to operate on an operating system such as Sun's Solaris operating system or other operating systems designed for executing server-type applications. Referring to FIG. 14, the eCommerce server 14 comprises a hardware platform 1402 on which an operating system 1404 executes. The actual eCommerce server application 1406 presents a front end module 1408 and a back end module 1410 to the various other components of the SCDP system 200. Specifically, front end module 1408 of server 1400 may be implemented to produce a web server front end to the other components of SCDP system 200 through network 205. Such a front end is similar to other web servers which currently exist on the Internet. The back end 410 module of server 1400 interfaces with billing database 204 and implements logic and/or objects necessary for query the database and executing transactions and microtransactions associated with the negotiation and purchase of a title. As mentioned previously, eCommerce server 1400 may be coupled either through a private local area network or over a global area network, such as the Internet to a third party credit processing server of a bank or other financial institution which may perform services such as credit card clearing, electronic account debiting, etc. Front end module 1404 and back end module 1410 of server 1400 communicate through a series of scripts written in accordance with the Common Gateway Interface (CGI) standard. It will be obvious to those reasonably skilled in the art that other commercially available electronic commerce server applications may be utilized with the inventive SCDP system in addition to those mentioned herein.

Database 204, associated with server 202 may comprise a conventional serial data base and is used to store credit and billing information necessary to carry on transactions.

Front end module 1408 of server 1400 further comprises the necessary code or objects to generate launch strings as explained in greater detail with reference to FIG. 9. Once generated, the launch strings are forwarded to the CAS server for digital signing thereof.

In the illustrative embodiment, the eCommerce system comprises a server and the storefront, which work together to enable the user to navigate through a catalog and accept and validate purchase information. The eCommerce system uses an open web-based architecture for interfacing with external components. The inventive SCDP system software modules communicate with the eCommerce software by posting URLs to the eCommerce software's web server front end. In responding to the posting, transact makes a call to a CGI program with specific arguments encoded in the URL. Evaluating the URL via the CGI call causes the Transact software to change the database state. An entire transaction sequence is completed by simply evaluating a set of URLs. The e-commerce system will captured and maintain client data, such as user accounts or credit card information.

Assuming the eCommerce system is a full-featured system that provides the ability to commerce-enable a storefront and conduct credit card transactions through the web, interaction between the CAS and eCommerce system occurs primarily in three different places. When the user has purchased a title, the user is presented with a page, referred to as a "Digital Receipt", on which appears a link called the Fulfillment URL. The Fulfillment URL is really a CGI program whose purpose is to obtain a Launch String from the CAS. As described in greater detail herein, a Launch String is a collection of all the information needed for the CAS to later recognize the user's right to the software and then settle a transaction with the eCommerce system. This information is returned in a form that only the CAS can recognize, so that the CAS can later validate its own Launch Strings. Returning the Launch String to the client browser triggers the browser to activate the Launcher within the SCDP client and pass the launcher the Launch String. Subsequently, the Launcher may provide a launch string to the CAS and request an activator. The CAS verifies the Launch String and asks the eCommerce server to validate that this purchase, if settled, would succeed. However, the CAS does not yet actually settle the transaction. At this point the CAS returns an activator to the Launcher and the title can begin to run. The initial activator is created with a short lifespan, e.g., finally, when the initial activator is about to expire, the SCDP client VxD notifies the Launcher and requests that the CAS refresh the activator. On the first refresh of the activator, CASLIB32 again provides the Launch String and this time the CAS will settle the transaction with the eCommerce server. Delaying settlement of the transaction allows the SCDP system to positively guarantee that the title has run properly on the SCDP client machine before billing for its use.

The SCDP system supports five different purchase models. The first purchase model, Title Subscriptions offers unlimited access to a specific title for a specified period of time. Subscriptions can be renewed. The second purchase model, Package Subscriptions such as an "Arcade Game Pack", offers unlimited access to a set of multiple titles for a limited time. The set of titles covered by a package subscription could change over time. For example, if the user purchases a subscription to the "Hot New Games Pack", the titles available under this package may not be the same a week or two after the initial subscription purchase. The third purchase model, Pay Per Use, offers access once for an unlimited amount of time. In the fourth purchase model, Time-Based Billing, a user is charged more for running the title for longer or can buy a fixed block of time. In the fifth purchase model, Monthly Billing, the SCDP system is integrated into an existing cable Multiple Server Operation (MSO) or telco billing system and adds charges to the customer's monthly bill. Additional purchase models can be added with minor changes.

Virtual Store Front

The Virtual Store Front server 215 and accompanying database 213 present a virtual catalog to clients and prospective clients of the SCDP system 200. In the illustrative embodiment, server 215 may be implemented as a conventional web server, e.g., a server application executing on top of an operating system which, in turn, executes on top of a server hardware, similar to those described with reference to eCommerce server 202. The store front application includes a graphic user interface which presents a series of selections for clients to browse with a conventional network browser. Such selections may include the name of a particular title, a brief description of the title, associated costs or purchase options, in the event of a multimedia title, such as a movie or audio clip, brief samples of the title content, etc. In addition, associated with each title selection is a corresponding URN. As such, the store front implements the appropriate database querying engine to interact with database 213 on which the title, description, pricing, digital offer, and URN information may be stored for a large number of possible titles within the SCDP system 200. In response to selection of a particular title, the store front application logic queries database 213 for the corresponding URN and forwards the appropriate information to eCommerce server 202 in a manner described herein.

In the illustrative embodiment, virtual store front server 215 and database 213 are coupled to cache server 210 over a private, secure local area network 205, as previously described. It will be obvious, however, to those reasonably skilled in the art that the SCDP system 200 may be implemented with one or more virtual store fronts coupled to the cache server 210 and the eCommerce server 202 over other than a local area network, for instance a global area network, such as the Internet in a manner reasonably understood by those skilled in the arts. In such implementations, where the storefront server resides on a public network, various subsets of information may be available for viewing by perspective clients. For instance, clients who pay a subscription fee may have access to a storefront server on the private network which may provide greater information and/or samples of title data then the general public accessing a store front server located on a public network which may provide only minimal information regarding a title and its associated purchase options.

Briq Format

FIG. 12 illustrates conceptually a block diagram of a briq in accordance with the present invention and its constituent components. As illustrated, a briq 1200 comprises a briq header 1202, a cryptoblock 1204, a superblock 1206 and one or more titles 1208A-1208N. The briq header 1202 contains information used by the launcher module within the SCDP client, including such information as system registration information, resolution, application title, a URL, etc. The cryptographic block 1204 is used by the ARFSD VxD within the SCDP client to determine if the title is encrypted, and, if so, the cryptographic key version used for such encryption. The superblock 1206 may include general information about the briq including the size of the briq, the creation date, the entry in which the ROOT directory may be found, etc. Each of the titles 1208A-N may include a directory and one or more files associated with a particular title. As explained hereinafter, briqs are stored on the RAFT Server, accessed remotely by an SDCP client using the RAFT protocol, and presented to the host's operating system as a local file system.

In accordance with the present invention, one or more titles are processed and packaged in the form of a briq, as described with reference to FIG. 12. The process by which a title is formatted into a briq is as follows. First, a utility tool, such as the viewer utility in the Windows operating system is used to extract registry information from a title. Such registry entries may comprise a minimal set of information such as the file names, directory names and configurations citings necessary to execute a particular title. The extracted registry entries are placed into a file. Next, the file containing the registry entries are provided to a creator program. The creator program, in the illustrative embodiment, comprises code capable of taking the data comprising the title and the registry entry file and encrypting such information in accordance with any number of currently available encryption algorithms. The resulting encrypted files may be stored in a conventional directory hierarchy, as illustrated by directories 1208A-N of FIG. 12. Next, the root directory of the file system and any additional meta information including the size of the file system, etc., are stored in the superblock 206 of the briq 1200, as illustrated in FIG. 12. Next, information about the decryption key, necessary to decrypt the encrypted information within the briq, is stored in the cryptoblock 1204. The information within the cryptoblock may comprise data identifying the key version and a description of the type of encryption used. The information in cryptoblock 1204 may be partially encrypted. Information such as the briq URL, and system requirements are placed into the briq header 1202 along with the names of the executable files and titles, and a map of the network drive and additional tags. The information contained within briq header 1202 is not encrypted, as illustrated in FIG. 12.

Activator

Figure 13:
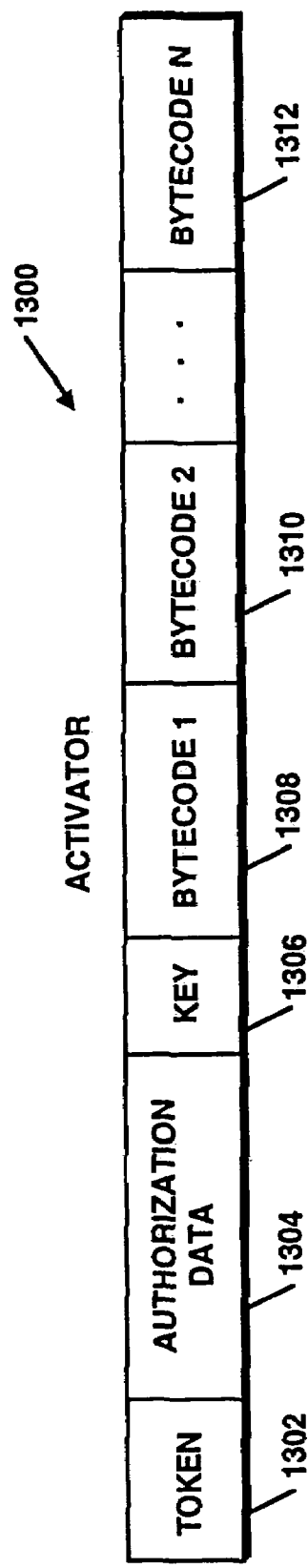
FIG. 13 is a conceptual block diagram of an activator in accordance with the present invention.

The activator has a format as illustrated in FIG. 13. Specifically, an activator 1300 comprises a token 1302, authorization data 1304, a cryptographic key 1306, and, optionally, one or more byte codes 1308-1312. In the illustrative embodiment, token 1302 may be implemented similar RAFT token 800, as described previously with reference to FIG. 8 herein. Authorization data 1304 comprises the "keep-alive" data useful by the SCDP client when requesting a new activator from the CAS server. Such authorization data may be implemented with a simple numeric string or code or, alternatively, may have a more sophisticated implementation, such as a hash of data previously associated with the client. Key 306 comprises cryptographic data useful in decrypting the data contained within the briq prior to execution. The cryptographic data comprising key 306 may comprises a bit string which is extracted by byte code interpreter 308 and supplied to the RAFT VxD to facilitate decryption of briq data.

In a simple embodiment, activator 1300 comprises only token 1302, authorization data 1304 and key 1306. In a more sophisticated embodiment, one or more byte codes 1308-1312 are also included as part of the activator. In the illustrative embodiment, byte codes are essentially instructions executable on either a physical or virtual machine, as implemented within the byte code interpreter 308. In the illustrative embodiment, byte code interpreter 308 comprises a virtual machine capable of executing such byte codes as supplied to it from the activator. The type and nature of possible byte codes 1-N which may be used with activator 1300 are described hereafter. Byte code interpreter 308 is described with reference to FIG. 3C.

Code Obfuscation

The essence of a program can be broken up into flow and primitives. Normally flow includes building up higher level abstractions out of primitives. Optimization involves combining redundant primitives, rearranging flow so similar structures can be combined and eliminated, and recognizing patterns and replacing them with other, more efficient patterns. Optimization preserves the behaviour of a program with respect to the original specification. Obfuscation operations may produce more than one correct result. Rather than selecting randomly, producing all or some subset of correct variants in parallel may be more efficient overall, at some cost to the individual production.

Generically, optimization involves looking for ways to take a solution to a problem and modify it to produce a better solution. In compilation specifically, it implies taking a simply produced, correct expression of a piece of high level code and turning it into more efficient code while preserving its correctness. Pessimization also preserves this correctness, but sacrifices efficiency for decompilation difficulty in the form of obfuscation.

By splitting front end and assembler stages allows insertion of pessimizers at different levels and allows later alternative high level languages (such as Lisp/Scheme) which provide for more flexibility in pessimization. A number of pessimizer techniques may be utilized with the present invention, including 1) Assembler-level Peephole Pessimizer which takes bytecode streams and does local reordering and obfuscation; 2) Intermediate Language Pessimizer which exposes the translation layer between the high level language and the assembler in order to provide a more natural interface for certain structural pessimizations; and 3) High-level Manual Pessimizer which, rather than actually performing generic operations on high level language code, allows the coder to specify multiple ways of expressing a given function and then have the compiler directly produce a form with combinatoric expansion of alternatives already initiated.

In theory, it is always possible for someone to single step the activator and monitor the changes it makes and thus figure out how to decode the briq, or even more simply, to stop once the briq is decoded and dump the cleartext out of memory. By using differing bytecode sequences, written in a hard-to-interpret "obfuscated" manner, and avoiding reusing identical ones, e.g. skeleton keys, the present invention utilizes constructs which make the work of the human decompiler hard, and the automatic analysis impossible. The bytecode makes the an unauthorized cracker's work on a single download arbitrarily time consuming, and not applicable to any other download. Sample obfuscation techniques useful with the activators of the present invention may include

- Selecting from a large pool of algorithms for each operation so that even a second request for the same object gets significantly different code;
- Apply behaviour-preserving operations directly to the byte code, using compiler optimization techniques for examples.
- Have the SCDP client support multiple sets of byte codes, or cryptographically key the byte code list itself.
- Self-modifying byte code.
- "trapdoor" byte code streams, e.g. generating a sequence of bytecodes, and a mapping function that picks out a subset and maps the bytecode subject into a useful algorithm. It may be necessary to define constraints and then search a space for useful sequences.
- "Dead code" bytecodes, possibly related by pattern to existing codes as a distraction.
- "abstain from" certain bytecodes, e.g., code has different meanings on subsequent runs. (High level tools can simply interleave working algorithms to produce these. Extensions include abstaining from any instruction which references a particular location or register.
- "unary" operators for use in crypto implementations.
- Optimize the byte code mapping based on parameters of the code, e.g., frequency of use, unrelated factors, etc.
- When implementing crypto directly in bytecode, deliver partial key/schedules or code sequences to generate keys instead of "standard" format keys.
- Have the byte code download additional bytecode through later callbacks, or have the server send down byte code changes asynchronously.
- Use existing environmental data as sources of byte codes, data, keying material, or weak entropy, such as the briq itself, or other binaries in the environment, or even the downloaded bytecode.

Ideally, obfuscations may be produced into a framework that provides information about how they can be combined with each other, and how they can be operated upon.

Techniques

Another way to give Activators additional strength is to make them incomplete, so that they need to make further contact with the CAS to continue operating. A "Technique" is a piece of code that runs in the CAS and is customized to support such requests. Although multiple techniques could may be used, a single Technique may serve a class of activators. A simple Technique implementation can be hard coded into the CAS, or, alternatively, implemented with dynamically loaded bytecode or shared objects. The activator to Technique protocol may be a layer on top of an existing RPC for transport from the SCDP client, eliminating the need for the technique to have predefined messages. In the present invention, activator bytecode and Technique bytecode may be treated as distinct languages. Technique code may instead simply have single bytecodes for entire cryptographic routines.

In order to implement obfuscated bytecode in the activators of the present invention, the following components are utilized: 1) bytecode interpreter; 2) a bytecode assembler; 3) cryptographic bytecode routines; 4) an interface to the ARFS VxD to call in to the activator at useful points; 5) protocol as decsribed herein which enables the activator to communicate with the technique implementation in the CAS; 6) CAS Activator construction functions (activator factory 710);

The reader will appreciate that the inventive system described herein facilitates the on demand delivery of secure content over broadband networks as well as private intranets.

The above-described invention may be implemented in either all software, all hardware, or a combination of hardware and software, including program code stored in firmware format to support dedicated hardware. A software implementation of the above described embodiment(s) may comprise a series of computer instructions either fixed on a tangible medium, such as a computer readable media, e.g. diskette 142, CD-ROM 147, ROM 115, or fixed disk 152 of FIG. 1, or transmittable to a computer system in a carrier wave, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions whether contained in a tangible medium or a carrier wave embodies all or part of the functionality previously described herein with respect to the invention. Those skilled in the art will appreciate that such computer instructions can be written in a number of programming languages for use with many computer architectures or operating systems and may exist in machine executable format. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results.

What is claimed is:

1. A method for creating an activator for processing a content title into executable form, comprising:
   generating, by a computer system, an activator, the activator including cryptographic data for decrypting content title data, the cryptographic data is encoded in obfuscated bytecode to inhibit unauthorized extraction of the cryptographic data, wherein the obfuscated bytecode implements executable instructions for decrypting content title data and the obfuscated bytecode is consumable by a bytecode interpreter that is configured to interpret and execute the obfuscated bytecode to obtain the cryptographic data for decrypting the content title data;
   adding authorization data to the activator, the authorization data identifying a time period in which the content title remains in an executable form;
   sending the generated activator in the form of the obfuscated bytecode to a client; and
   sending the content title data to the client, the content title data including a downloadable file system that includes files associated with the content and simulated registry values, wherein the content is configured to be executed by using the files stored in the downloadable file system and using the simulated registry values to simulate an installation of the content in a client file system.

2. The method of claim 1, further comprising:
   creating a token authorizing the client system to access the content title stored on the content server; and
   storing the token with the activator at a location.

3. The method of claim 2, wherein the activator is valid for a single use.

4. The method of claim 1, further comprising:
   creating a token authorizing the client system to access a content title stored on the content server.

5. The method of claim 1, wherein the activator is valid for a single use.

6. A method, comprising:
   receiving by a client computer system, an activator, said activator providing cryptographic data for decrypting content title data, said cryptographic data embedded in obfuscated bytecode to inhibit unauthorized extraction of the cryptographic data, said obfuscated bytecode implements executable instructions for decryption of content data;
   receiving authorization data, the authorization data identifying a time period in which the content title remains in executable form;
   receiving the content title data, the content title data including content, a downloaded file system, and simulated registry values for an executing instance of the content;
   executing a virtual machine, the virtual machine including executable instructions for interpreting and executing obfuscated bytecode;
   executing, by the virtual machine, the accessed activator in the form of the obfuscated bytecode to generate the cryptographic data for decrypting content title data;
   decrypting the content title data using the generated cryptographic data;
   mounting the downloaded file system;
   executing, by using information stored in the downloaded file system, the content;
   intercepting an operating system request for a registry value associated with the execution of the content; and
   sending a simulated registry value to the operating system thereby simulating an instillation of the content on the client.

7. The method of claim 6, further comprising:
   receiving a token that allows the client system to access a content title stored on the content server.

8. The method of claim 7, wherein the activator is valid for a single use.

9. The method of claim 6, wherein the activator is valid for a single use.

10. A method comprising:
   generating, by a computer system, an activator, the activator including cryptographic data for content title data in obfuscated bytecode to inhibit unauthorized extraction of the cryptographic data, wherein the obfuscated bytecode implements executable instructions for decrypting content title data, the obfuscated bytecode consumable by a virtual machine that is configured to interpret and execute the obfuscated bytecode to obtain the cryptographic data for decrypting the content title data;

storing the generated activator in the form of the obfuscated bytecode;

wherein the activator includes authorization data, the authorization data identifying a time period in which the content title remains in executable form, said generated cryptographic data being valid only for the identified time period;

wherein the content title data includes content, a downloadable file system that includes files associated with the content, and simulated registry values; and wherein the content is configured to be executed by using the files stored in the downloadable file system and using the simulated registry values to simulate an instillation of the content in a client file system.

11. The method of claim 10, further comprising:
creating a token authorizing the client system to access a content title stored on the content server; and
storing the token with the activator at a location on the computer network accessible by the client system.

12. The method of claim 11, wherein the activator is valid for a single use.

13. The method of claim 10, wherein the activator is valid for a single use.

* * * * *